US012259486B2

(12) United States Patent
Chrabieh et al.

(10) Patent No.: US 12,259,486 B2
(45) Date of Patent: Mar. 25, 2025

(54) TIME DIFFERENCE OF ARRIVAL MULTILATERATION METHOD FOR MOBILE POSITIONING

(71) Applicant: NextNav France, Neuilly-sur-Seine (FR)

(72) Inventors: Rabih Chrabieh, Paris (FR); Mazen Neifer, Courcouronnes (FR); Ines Ben Hamida, Courcouronnes (FR); Ganda Ouedraogo, Montévrain (FR)

(73) Assignee: NextNav France, Puteaux (FR)

( * ) Notice: Subject to any disclaimer, the term of this patent is extended or adjusted under 35 U.S.C. 154(b) by 355 days.

(21) Appl. No.: 17/769,815

(22) PCT Filed: Oct. 28, 2020

(86) PCT No.: PCT/EP2020/080235
§ 371 (c)(1),
(2) Date: Apr. 18, 2022

(87) PCT Pub. No.: WO2021/083932
PCT Pub. Date: May 6, 2021

(65) Prior Publication Data
US 2022/0373638 A1    Nov. 24, 2022

Related U.S. Application Data

(60) Provisional application No. 62/927,649, filed on Oct. 29, 2019.

(51) Int. Cl.
*G01S 5/02* (2010.01)
*H04L 5/00* (2006.01)

(52) U.S. Cl.
CPC ......... *G01S 5/0246* (2020.05); *G01S 5/0278* (2013.01); *H04L 5/0051* (2013.01)

(58) Field of Classification Search
CPC ..... G01S 5/0246; G01S 5/0278; H04L 5/0051
(Continued)

(56) References Cited

U.S. PATENT DOCUMENTS

2015/0369924 A1* 12/2015 Hedgecock ............. G01S 19/51
                                                            342/357.34
2016/0187458 A1*  6/2016 Shah ...................... H04W 4/02
                                                            455/456.1

OTHER PUBLICATIONS

Observed Time Difference Of Arrival (OTDOA) Positioning in 3GPP LTE by Sven Fischer Jun. 6, 2014.
(Continued)

*Primary Examiner* — Ted M Wang
(74) *Attorney, Agent, or Firm* — MLO, a professional corp.

(57) ABSTRACT

A method for location determination in a wireless communications system solves a minimization problem using estimated time-of-arrivals (TOAs) of reference signals [108, 110, 112] received by a receiving node [100] from transmitting nodes [102, 104, 106] and predetermined locations of the transmitting nodes, to produce an estimate of unknown receiving node location and/or an estimate of an unknown time of transmission (t) of the reference signals. The minimization problem is defined in terms of a theoretical system model of time-of-arrivals (TOAs), linearized globally as a function of the unknown receiving node location, the unknown time of transmission (t) of the reference signals, and an additional intermediate variable (u) that defines a non-linear quadratic constraint over position coordinates of the unknown receiving node location and the time of transmission (t) of the reference signals, wherein the minimization problem optimizes the additional intermediate variable (u). The method may also be implemented with the roles of transmitters and receivers interchanged.

8 Claims, 10 Drawing Sheets

(58) Field of Classification Search
USPC .................................................. 455/456.1
See application file for complete search history.

(56) References Cited

OTHER PUBLICATIONS

Positioning for the Internet of Things: A 3GPP Perspective, Lin et al. https://arxiv.org/ftp/arxiv/papers/1705/1705.04269.pdf, Dec. 12, 2017.
J. Smith and J. Abel, "The Spherical Interpolation Method of Source Localization," IEEE Journal of Oceanic Engineering, vol. OE-12, pp. 246-252, Jan. 1987.
B. Friedlander, "A passive localization algorithm and its accuracy analysis," IEEE Journal of Oceanic Engineering, vol. 12, No. 12, pp. 234-245, Dec. 1987.
Y. T. Chan and K. C. Ho, "A simple and efficient estimator for hyperbolic location," IEEE Trans. Signal Process., vol. 42, No. 8, pp. 1905-1915, Aug. 1994.
H. Schau and A. Robinson, "Passive source localization employing intersecting spherical surfaces from time-of-arrival differences," Acoustics, Speech and Signal Processing, IEEE Transactions on, vol. 35, No. 8, pp. 1223-1225, Aug. 1987.
K.W. Cheung, H.C. So, W.K. Ma, Y.T. Chan, "A Constrained Least Squares Approach to Mobile Positioning: Algorithms and Optimality," EURASIP Journal on Advances in Signal Processing 2006 (1), 1-23.
A. Beck, P. Stoica, and J. Li, "Exact and approximate solutions of source localization problems," IEEE Transactions on Signal Processing, vol. 56, No. 5, pp. 1770-1778, 2008.
P. Bestagini, M. Compagnoni, F. Antonacci, A. Sarti, S. Tubaro, "TDOA-based acoustic source localization in the space-range reference frame," Multidimensional Systems and Signal Processing, pp. 1-23, Mar. 2013.
V. Heidari, M. Amidzade, K. Sadeghi, and A. M. Pezeshk, "Exact solutions of time difference of arrival source localization based on semi-definite programming and Lagrange multiplier: complexity and performance analysis," IET Signal Processing, vol. 8, No. 8, pp. 868-877, 2014.
S. Bancroft, "An Algebraic Solution of the GPS Equations," IEEE Trans. on Aerospace and Electronic Systems, vol. AES-21, No. 7, Jan. 1985.
Diez-González et al. 3D Tdoa Problem Solution with Four Receiving Nodes. Sensors 2019, 19, 2892; doi:10.3390/s19132892.
Jin et al. Robust Time-Difference-of-Arrival (TDOA) Localization Using Weighted Least Squares with Cone Tangent Plane Constraint. Sensors 2018, 18(3), 778; https://doi.org/10.3390/s18030778.
Kitic et al A Comparative Study of Multilateration Methods for Single-Source Localization in Distributed Audio. https://arxiv.org/pdf/1910.10661.pdf, Jul. 28, 2020.
Chapter 10: Localization, Wireless Sensor Networks (CSE 40815) Fall 2010—University of Notre Dame.
Xiong et al. TDOA-based localization with NLOS mitigation via robust model transformation and neurodynamic optimization. https://arxiv.org/pdf/2004.10492.pdf, Aug. 20, 2020.

* cited by examiner

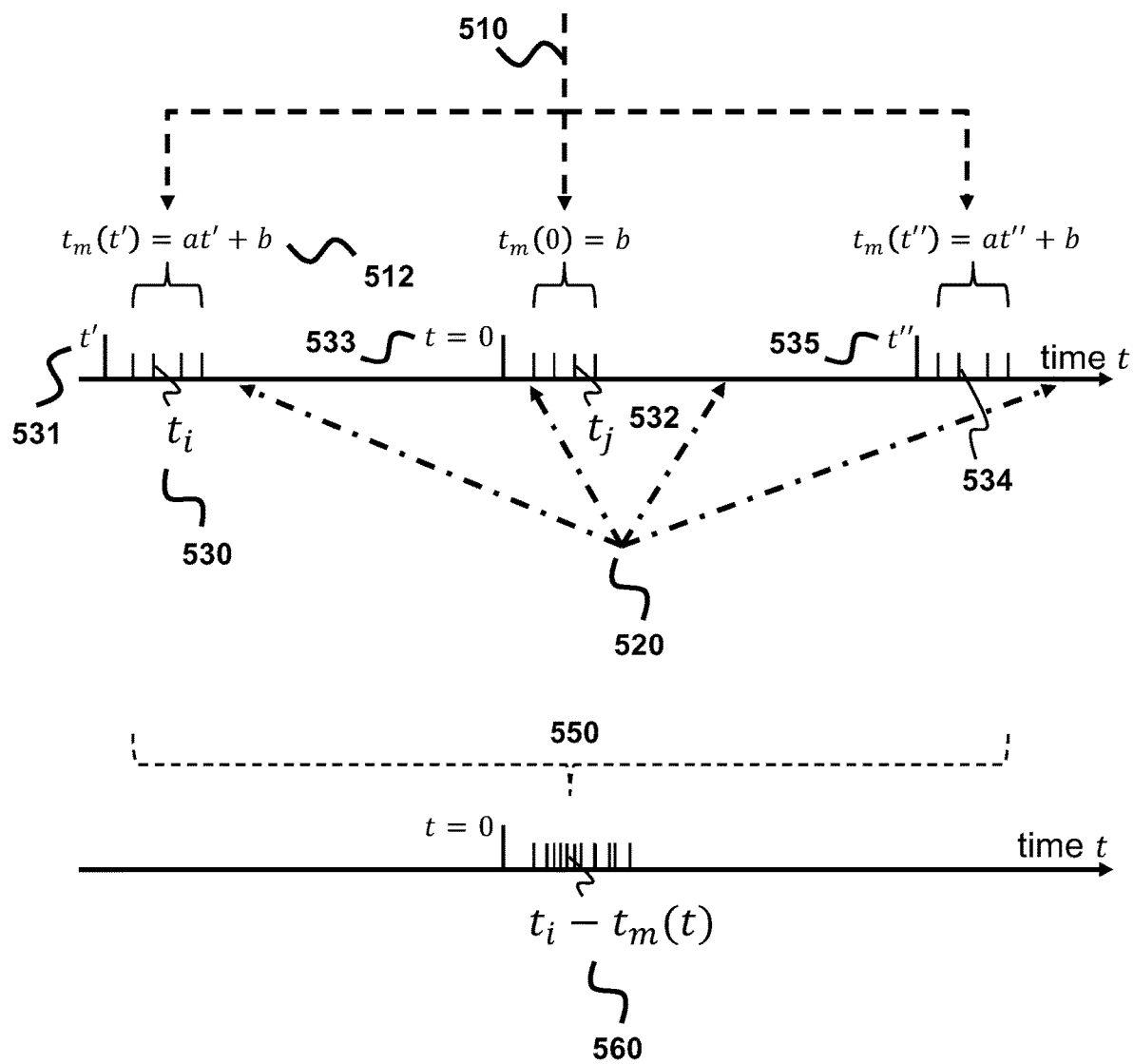

TIME DIFFERENCE OF ARRIVAL MULTILATERATION METHOD FOR MOBILE POSITIONING

FIELD OF THE INVENTION

The present invention relates generally to wireless communication. More specifically, it relates to methods for location determination of mobile wireless devices.

BACKGROUND OF THE INVENTION

Modern wireless cellular systems such as LTE (4G) and 5G provide various mobile positioning methods that use received power or time of flight (distance) estimation between a User Equipment (UE) and a set of cellular antenna towers in order to locate the UE. In particular, a standardized downlink TDOA (Time Difference of Arrival) method in LTE is denoted by OTDOA (Observed Time Differences of Arrival) and uses the time of arrival (TOA) of reference signals (RS) or pilots in order to determine time of flight between the UE and each antenna tower. In 5G it is denoted by DL-TDOA. The user equipment (UE) estimates the RS time of arrival from second cells relative to the RS time of arrival from a first cell, which is a reference cell (e.g., the cell serving the UE). The difference between the two measured time of arrivals is denoted by RSTD (Reference Signal Time Difference).

The UE reports several estimated RSTD between second cells and a reference cell. The measurements are reported to a location server that knows the position of the antenna towers. The location server may optionally be located inside the UE. The combination of antenna tower positions and RSTD measurements enable locating the UE via some multilateration formula. Taking normalized speed of light $c=1$, the RSTD measurement by UE of the signal from antenna tower i is defined as the estimated difference between the measured time of arrival of signals TOA(i) and TOA(0), corresponding respectively to cell indexed i and reference cell indexed 0, $$RSTD(i)=TOA(i)-TOA(0)$$

This measured RSTD(i) should be equal to the theoretical RSTD of the system model, $$d_i - d_0 + n_i - n_0 = \sqrt{(x-x_i)^2+(y-y_i)^2+(z-z_i)^2} + n_i - \sqrt{(x-x_0)^2+(y-y_0)^2+(z-z_0)^2} - n_0$$

where x,y,z are the unknown 3D coordindates of the UE whose position is to be determined, $x_i, y_i, z_i$ are the coordinates of antenna tower indexed i, and i=0 corresponds to the reference antenna tower. $d_i$ is the true distance between UE position and antenna tower i. $d_0$ is the true distance between UE position and antenna tower 0, and the (unknown) noise in the system model is denoted by $n_i$. The multilateration problem typically consists of minimizing a Least Squares problem, namely $$\min_{x,y,z} \sum_i \left[ RSTD(i) - \left( \sqrt{(x-x_i)^2+(y-y_i)^2+(z-z_i)^2} - \sqrt{(x-x_0)^2+(y-y_0)^2+(z-z_0)^2} \right) \right]^2$$

The solution of which are the UE coordinates x,y,z.

Note that RSTD(0)=0 and carries no information, i.e., we have one less equation than we have TOA estimates. Or, the number of RSTD measurements to report are one less than the number of computed TOA estimates.

On the other hand, in satellite navigation systems (GNSS), the multilateration problem is stated as a Time of Transmission problem or TOT. In this case, the time of arrival is theoretically defined in the system model as $$\sqrt{(x-x_i)^2+(y-y_i)^2+(z-z_i)^2}+b+n_i$$

where b is the UE clock bias; an unknown intermediate variable to be estimated. It models the unknown bias or delta between the UE time and the base transmitter's time. In this case, it is assumed that all transmitters are synchronized to the same time, or at least that their transmission time is known and can be subtracted from the formula. The TOT formula may also be viewed as the theoretical TOA being equal to true distance plus time of transmission $\bar{t} \triangleq b$ plus noise, $d_i+\bar{t}+n_i$. This time of transmission from the UE's point of view or in the UE's time referential, equivalent to UE clock bias, is unknown to the UE. It will be jointly determined with the UE's position by the TOT multilateration solution. One can view a multilateration system as measuring N+1 Time of Arrivals (TOAs), and then either: (a) determining the time of transmission (TOT) and up to n user coordinates; or (b) ignoring the TOT and forming n time difference of arrivals (TDOAs), which are used to find up to n user coordinates. Systems and algorithms have been developed for both concepts. The latter (b) is addressed first, as it was the first implemented (roughly, pre-1975); in practice, those systems largely determine a user/vehicle location in two dimensions. A TDOA, when multiplied by the propagation speed, is the difference in the true ranges between the user and the two stations involved (i.e., the unknown TOT cancels). The former (a) is addressed second (it was implemented, roughly, post-1975).

In practice, TOT/TDOA systems largely determine a user/vehicle location in three dimensions. A TOA, when multiplied by the propagation speed, is termed a pseudo range. By definition, RSTD(i)=TOA(i)-TOA(0).

State of the art multilateration solutions that find a global minimum (namely Spherical Interpolation (SI), Spherical Intersection (SX), Constrained Spherical Interpolation (CSI), also known as semidefinite programming or relaxation) typically convert a TOT problem into a TDOA problem in order to eliminate the time of transmission parameter, and then use a well-known global linear formulation of the TDOA problem (using a squaring operation). By doing so, correlated or colored noise statistics are introduced, noise statistics are complicated, noise enhancement can be observed especially if the reference node is noisier than other nodes, and performance is reduced.

Furthermore, state of the art solutions using TDOA fail to optimally combine measurements from different groups of measurements that are performed hundreds of milliseconds apart. An issue with using TOT multilateration is the drift of the time of transmission over time if measurements are not made within a short duration (e.g. within tens of milliseconds). Hence, by using TDOA this issue can be resolved as follows: re-estimate in each group of measurement the TOA of some reference cell and subtract it in order to eliminate the time of transmission and its problematic drift. But this solution is sub-optimal.

SUMMARY OF THE INVENTION

In one aspect, the invention provides a method for location determination in a wireless communications system having a receiving node and transmitting nodes, wherein the receiving node receives reference signals from the transmitting nodes, some of which may be reference cells. The method for location determination comprises: solving a minimization problem using estimated time-of-arrivals (TOAs) of the reference signals and predetermined locations of the transmitting nodes, to produce an estimate of unknown receiving node location and/or an estimate of an unknown time of transmission ($\bar{t}$) of the reference signals; wherein the minimization problem is defined in terms of a theoretical system model of time-of-arrivals (TOAs), linearized globally as a function of the unknown receiving node location, the unknown time of transmission ($\bar{t}$) of the reference signals, and an additional intermediate variable (u) that defines a non-linear quadratic constraint over position coordinates of the unknown receiving node location and the time of transmission ($\bar{t}$) of the reference signals, wherein the minimization problem optimizes the additional intermediate variable (u).

In some embodiments, the solving is performed by the receiving node. In some embodiments, the solving is performed by one of the transmitting nodes, wherein the method further comprises receiving by the one of the transmitting nodes the estimated time-of-arrivals (TOAs) from the receiving node. In some embodiments, the solving is performed by a location server, wherein the method further comprises receiving by the location server the estimated time-of-arrivals (TOAs) from the receiving node or from one of the transmitting nodes. In some embodiments, the method includes iterating the solving step.

In some embodiments, the minimization problem is a weighted least squares problem, using weights to account for modified noise statistics, or an iterative re-weighted least squares problem.

In some embodiments, the method further includes modeling a receiver clock drift using doppler estimates of the TOAs, and wherein the solving comprises using the model of receiver clock drift to compensate for receiver clock errors.

In another aspect, the invention provides a method for location determination in a wireless communications system having a transmitting node and receiving nodes, wherein the receiving nodes receive reference signals from the transmitting node. The method for location determination comprises: solving a minimization problem using estimated time-of-arrivals (TOAs) of the reference signals and predetermined locations of the receiving nodes, to produce an estimate of unknown transmitting node location and/or an estimate of an unknown time of transmission ($\bar{t}$) of the reference signals; wherein the minimization problem is defined in terms of a theoretical system model of time-of-arrivals (TOAs), linearized globally as a function of the unknown transmitting node location, the unknown time of transmission ($\bar{t}$) of the reference signals, and an additional intermediate variable (u) that defines a non-linear quadratic constraint over position coordinates of the unknown transmitting node location and the time of transmission ($\bar{t}$) of the reference signals, wherein the minimization problem optimizes the additional intermediate variable (u).

In another aspect, the invention provides a method for location determination in a wireless communications system having a receiving node and transmitting nodes, wherein the receiving node receives reference signals from the transmitting nodes. The method for location determination comprises: estimating time-dependent doppler effect errors in timing of the received reference signals; determining a time-dependent receiving node clock drift model from the estimated doppler effect errors; correcting TOA measurements of the reference signals using the receiving node clock drift model evaluated at a selected time; determining by TOT multilateration a receiving node location at the selected time using the corrected TOA measurements.

In some embodiments, the receiving node estimates the doppler effect errors, determines the receiving node clock drift model, and corrects the TOA measurements.

In some embodiments, one or more of the transmitting nodes estimates the doppler effect errors, determines the receiving node clock drift model, and corrects the TOA measurements.

In some embodiments, the method includes reporting from the receiving node to a location server the TOA measurements of reference signals received from one or more reference cells. In some embodiments, the method includes reporting from the receiving node to a location server the estimated time-dependent doppler effect errors. In some embodiments, the method includes reporting from the receiving node to a location server clock corrections from the receiving node clock drift model.

BRIEF DESCRIPTION OF THE DRAWINGS

FIG. 5 is a graph illustrating measurements at different times according to an embodiment of the invention.

DETAILED DESCRIPTION

Figure 1:
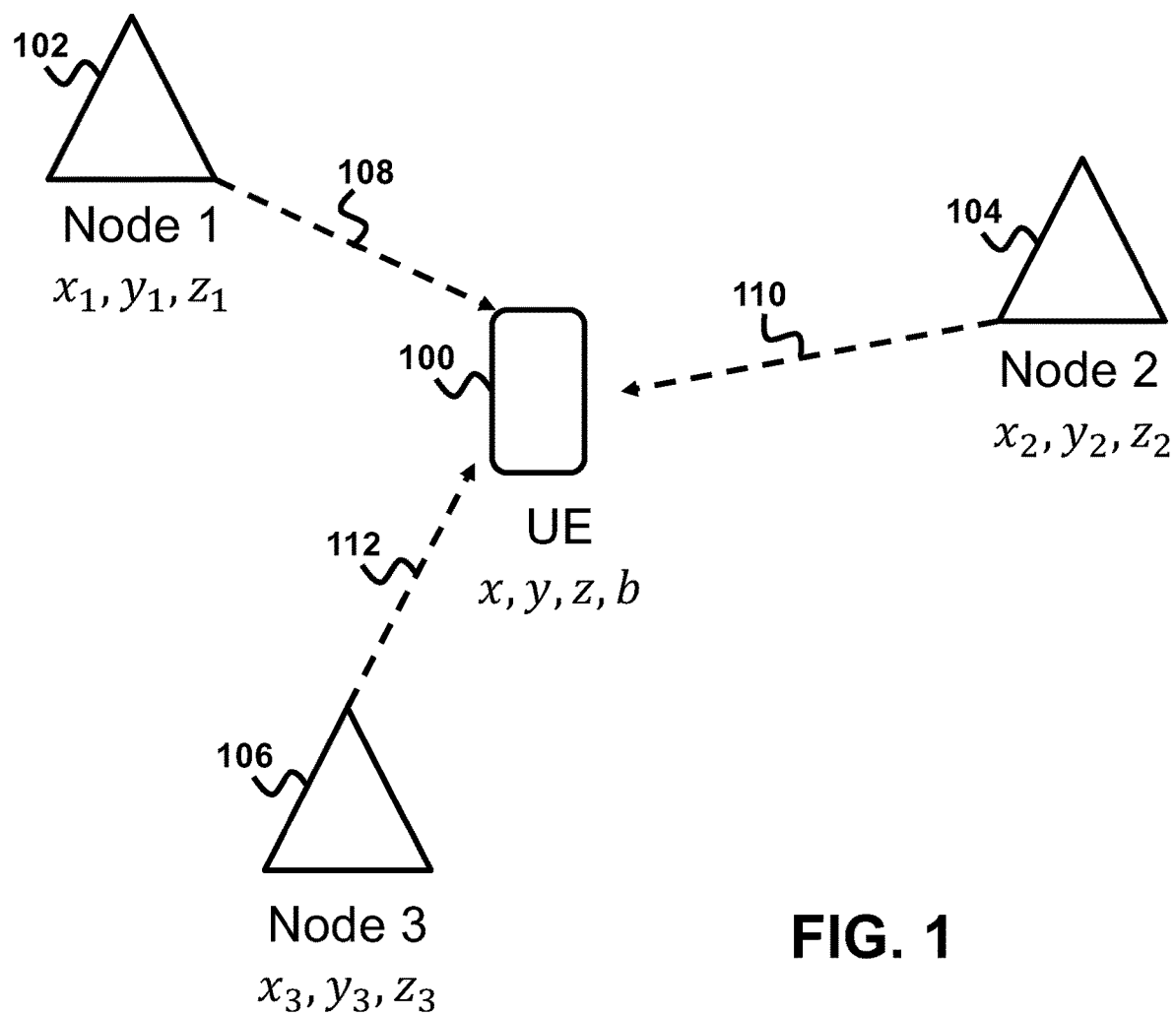
FIG. 1 is a schematic illustration of a wireless communication system according to an embodiment of the invention.

The problem with the TDOA or RSTD method is that it ignores an important parameter or observation that can improve the solution, especially when the TOA measurements of the reference cell (i=0) are noisier than those of other cells.

On the other hand, the problem with systems using a TOT method is that current art is not in the form of a closed-form, global solution, thereby limiting convergence speed and robustness in satellite navigation systems and terrestrial-based systems. Satellite based positioning may return a first position estimate that is completely in the wrong part of the world.

In one aspect of the invention, some current solutions such as those used in mobile wireless networks can be improved by transforming the TDOA problem into a TOT problem and solving the problem using a global solution, taking into consideration UE's clock bias, as well as the UE's Doppler.

Furthermore, state of the art Least Squares solutions of the problem of TDOA multilateration solve the problem by assuming "some" reference cell rather than modeling a time of transmission (TOT). TDOA multilateration is also known as hyperbolic multilateration. An improvement is obtained by transforming the TDOA model into a TOT model. To achieve this, we introduce an intermediate variable, the UE clock bias b relative to network time and increase the number of equations by 1.

For proper behavior, LTE OTDOA downlink positioning system requires an accurately synchronized network of cells. (A "cell" in the present description is defined to refer to a wireless communications service, provided by a wireless access point, base station, or other transceiver at a fixed location (terrestrial systems) or a physical entity such as a satellite, where the wireless service of a particular cell is defined by parameters such as frequency, sector, time, code or other multiple access technique for dividing spectrum).

This synchronization is needed in order to reduce interference between the transmitted RS (pilots) and to simplify the multilateration solution by eliminating the additional parameters of time difference between the cells.

In the United States the cellular networks are typically time synchronized by using GPS receivers and hence the observed TDOA (OTDOA) system is applicable and deployed. In Europe, the network cells are not synchronized in time and hence the OTDOA system cannot be deployed at the present time.

The UE has its own clock, assumed un synchronized to network time.

We reformulate the OTDOA problem as a TOT problem rather than a reference cell-based problem (TDOA), and we provide new global solutions to the TOT multilateration problem. The global solutions are closed-form solutions with approximate weights. Unlike the local Taylor expansion solution, they require no knowledge of an approximate initial guess. In terrestrial systems (e.g. OTDOA, WiFi TDOA, LoRa TDOA), a good initial approximate guess is typically unknown. In GNSS systems, an initial guess can be chosen as the center of the Earth; but in some cases, it can lead to an invalid local solution (i.e. local minimum) when the approximation is not good enough.

In other words, we introduce an intermediate parameter that models a clock bias in the UE and then solve the corresponding Least Squares multilateration problem. The solution tends to be superior to the current OTDOA solution using a reference cell, especially when the reference cell has noisier (e.g. outlier) measurements.

We replace the expression for theoretical RSTD, $$\sqrt{(x-x_i)^2+(y-y_i)^2+(z-z_i)^2}+n_i-$$
$$\sqrt{(x-x_0)^2+(y-y_0)^2+(z-z_0)^2}-n_0$$

by the expression for theoretical TOA $$\sqrt{(x-x_i)^2+(y-y_i)^2+(z-z_i)^2}+b+n_i$$

Where b is a clock bias; an unknown intermediate variable to be estimated. The UE estimates of TOA(i) measurements can be obtained similarly to RSTD(i) measurements from the TOA of cell index i but without subtracting TOA of reference cell index 0.

Alternatively, starting from N−1 measurements RSTD(i)=TOA(i)−TOA(0) where we had subtracted TOA (0) or any convenient constant, we may regenerate N TOA estimates by constructing the following corresponding TOT problem with observations being the RSTD(i) that can be written as $$RSTD(i) = TOA(i) - TOA(0) = \frac{d_i}{c} + b + n_i - TOA(0)$$

Hence, $$RSTD(i) = \frac{d_i}{c} + b' + n_i$$

$$RSTD = 0 = TOA(0) = \frac{d_0}{c} + b' + n_0$$

where b'=b−TOA(0) is an intermediate unknown synchronization variable to be jointly determined with the UE position x, y, z. As TOA(0) is a constant observation, the only difference between bias b and bias b' is a constant time shift i.e. change of time reference in the UE. The TDOA problem has been reformulated as a TOT problem by subtracting TOA(0) the (unknown) constant, i.e. the transmitted RSTD(i) replaces TOA(i) and 0 replaces the non-transmitted and implied RSTD(0)=0. Speed of light c can be normalized to 1.

FIG. 1 is a schematic illustration of a wireless communication system according to one embodiment of the invention, including UE receiver node 100 and transmitter nodes 102, 104, 106 sending reference signals 108, 110, 112, respectively, to UE 100.

Figure 2:
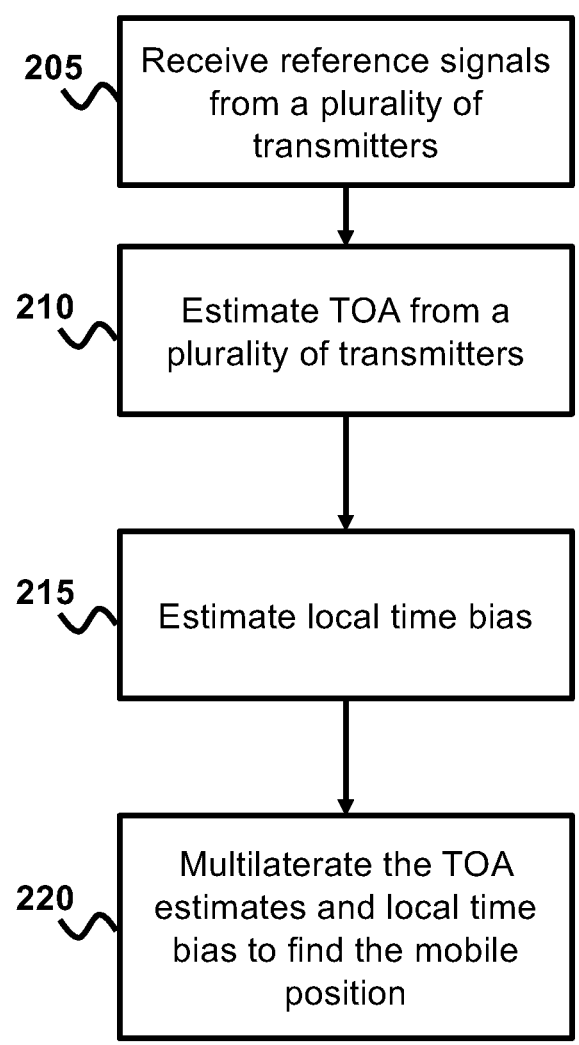
FIG. 2 is a flowchart illustrating steps to compute a global solution to a TOT multilateration problem according to an embodiment of the invention.

In an embodiment, the steps shown in FIG. 2 may be followed to compute a global solution to the TOT multilateration problem. In step 205, a UE receives reference signals from a plurality of transmitting devices such as a base station or satellite. The transmitting devices in some deployments may include one or more LTE reference cells as well as other cells. The transmitting devices may transmit the reference signals at the same time (i.e. synchronously) or at a known time, relative to a known system or network time. The term reference signals is used herein to refer to reference signals, positioning reference signals, synchronization signals, pilots, training sequences and similar signals transmitted from cellular base stations to mobile devices. In step 210, the UE estimates the TOA of each reference signal. In step 215 the UE estimates the local time bias, i.e., the estimated difference between the UE time and the network time. In step 220, the set of TOAs and local time bias are multilaterated to find the UE position. For example, the multilateration in step 220 may comprise one or more methods to solve a Least Squares multilateration problem.

One skilled in the art would appreciate that steps 205, 210 and 215 may be performed in an order different than is shown, and that some steps may be performed simultaneously or jointly.

The procedure defined in FIG. 2 may be performed on the UE. Alternatively, the UE may send the results from step 210 and step 215 to a location server (e.g. a base station, an edge server or a cloud server) with step 220 conducted by the location server.

Additionally, the procedure may be extended to include the reception of multiple reference signals from a single transmitter (step 205), and the TOA estimation from a plurality of transmitters with a plurality of received reference signals from each transmitter. Further, the estimation of the local time bias may comprise a plurality of estimates which may be combined to form the local time bias.

Further, in order to optimally resolve the issue of time of transmission drift between groups of measurements, rather than using TDOA we use TOT and we estimate the time of transmission's drift between the measurements. This is done via Doppler measurements performed by the UE or by the base stations. In particular for LTE OTDOA standard we propose new information that can be used by the UE or transmitted by the UE to the location server in order to improve multilateration accuracy. This may include transmitting to the location server the estimated time of arrival (TOA) of the reference cell, in particular if it has more than one estimate, in addition to the estimated RSTD of neighboring cells. The location server can use the TOA of the reference cell to add one or more equations when solving the multilateration problem. Equations of the type Meas_1=timeofflight_1+UEtime+noise_1, i.e. $TOA(i)=\sqrt{(x-x_i)^2+(y-y_i)^2+(z-z_i)^2}+b+n_i$. This new information may be used with TOT, TDOA, local or global multilateration solutions. A TOT problem can be converted to TDOA by subtracting a chosen reference cell's TOA(0) observation in order to eliminate the time of transmission or clock bias b. Other new information that may be transmitted to the network or location server is the Doppler estimates, for one or more cells, performed by the UE.

The solution is not specific to the cellular LTE OTDOA system and can be adapted to WiFi TDOA, UWB TDOA, GNSS TOT, etc. In particular, the same formulations and solutions presented in this application also apply to the uplink case, i.e. locating a transmitter from multiple receiver sites; as opposed to the downlink case, i.e. locating a receiver from multiple transmitter sites. Examples of uplink positioning systems are 3GPP's U-TDOA (Uplink TDOA) and uplink LoRa geolocation. In the case of uplink, the UE whose position and precise timing are unknown transmits reference signals; the base stations, who are synchronized, receive the reference signals. The equations are identical to the downlink case, $TOA(i)=\sqrt{(x-x_i)^2+(y-y_i)^2+(z-z_i)^2}+b+n_i$, where b is the same parameter modeling the unknown clock bias or time of transmission of the UE. One notable difference is that TOA(i) is computed in the receiving base stations rather than in the transmitting UE. Nevertheless, it is the same mathematical and physical models and has the same solution as for the downlink case.

We present novel global solutions to the TOT multilateration problem using a UE clock bias that provide improvements over the well-known TDOA's reference node methods (SI, SX, CSI). Additionally, a space-time notation with Minkowski metric is introduced that provides useful insights such as replacing hyperboles by hyper-cones when solving the multilateration problem. Similar hyper-cones are discussed in [7] in the space range that uses a reference node; however, we believe space-time notation without reference node and using a UE clock bias is more desirable. In [8], the Minkowski metric notation was introduced and a Spherical Intersection solution derived that neglects an important intermediate parameter in the LS minimization. We provide a more general and accurate solution extending to the Spherical Interpolation and Constrained Spherical Interpolation.

After changing the problem from TDOA to TOT, we now develop the formulas for a "global multilateration solution" using a UE clock bias as an intermediate variable. In cellular or LAN systems, we need a global solution since an approximate local Taylor expansion of the multilateration problem is insufficient given that we may not know an approximate initial guess of the position. We further extend the solution to the Least Absolute Deviations criterion in order to better handle measurements with outliers, in Non-Line-of-Sight or in heavy multipath scenarios.

In summary, we replace a TDOA problem by a TOT problem, solve the TOT problem using a global solution, and substitute the LS criterion by the LAD criterion in difficult environments such as urban canyons or indoor.

By replacing the TDOA problem with a TOT problem, we avoid creating the correlated noise $n_i-n_0$ and the square of the correlated noise that occurs in the linear formulation of the global solution. Although it is feasible to formulate a solution for the TDOA problem that accounts for the correlated noise and the squared noise, but the solution is mathematically equivalent to the more natural and straightforward TOT solution that we will propose.

The method may be applied to the estimation of the time of transmission, e.g. in order to synchronize with the network time. In this case, the position estimate may be discarded and only the estimated time of transmission used.

The method may apply to radio signals with the speed of light being $c \approx 300,000$ km/s but also to acoustic signals with the speed of sound being $c \approx 343$ m/s. The problem and solution for acoustic sensors is identical to the problem and solution for radio waves except for the change in the value of c. Acoustic signals are often used in underwater localization or in medical applications.

In the subsequent sections, we propose a mathematical model to simplify the notation and obtain the solution to various multilateration problems using time of transmission instead of cell reference.

A significant body of literature solves the problem of TDOA multilateration via the Least Squares error of range differences or time difference of arrival (TDOA), where one known node is used as reference node. It is usually denoted by hyperbolic multilateration.

However, these methods exhibit decreased performance because they drop one equation that contains extra information, and they increase noise (colored noise)—the noise from the reference node measurement or equation,—which is reinjected into the remaining measurements. A proper solution should account for the reinjected colored noise, which results in the solution using a time of transmission unknown rather than subtracting the TOA of a reference node.

The typically used expression for theoretical TDOA in 3D is $$\sqrt{(x-x_i)^2+(y-y_i)^2+(z-z_i)^2}-\sqrt{(x-x_0)^2+(y-y_0)^2+(z-z_0)^2}+n_i-n_0$$

where $x_i, y_i, z_i$ the position of node i, node 0 is assumed the reference node, and x,y,z is the position of the unlocalized node. The additive noise terms are $n_i$ and $n_0$ respectively for the TOA corresponding to localized nodes indexed i and 0.

Space-Time Model and Notation

An unlocalized node (UE) is defined as a communication device for which it is desirable to estimate its location. Examples of unlocalized nodes (UE) include but are not limited to mobile devices, smartphones, tracker devices, IoT devices, base stations, or antenna towers.

The general formula for estimating the location of an unlocalized node using TOA estimates, also denoted by pseudo-ranges in the GNSS terminology, is $$t_i = \frac{d_i}{c} + b + n_i$$

where i is an index of the i-th measurement related to the i-th anchor node (i.e. localized node, e.g. base node, access point, base station, tower, light emitter or receptor, etc.), $d_i$ is the unknown distance between unlocalized and localized node i, c=1 the speed of light that we assume normalized to 1 in this application by dividing distances by the speed of light or vice versa by multiplying times by the speed of light, b is the difference between the unknown time of transmission at the unlocalized node (UE) and the time of the localized nodes; it is an unknown clock bias representing the difference between the UE clock time and the network time of the synchronized localized nodes. $t_i \triangleq$ TOA(i) is the estimated time of arrival of the reference signal. We assume that all localized nodes are synchronized or that any synchronization bias or error has been pre-calibrated or pre-corrected; and remaining synchronization jitter or noise is accounted for in measurement noise $n_i$. The measurement noise is denoted by $n_i$ and can be modeled using Gaussian, uniform, Laplacian or other distribution, and may have known or unknown mean and standard deviation.

The mean of $n_i$ is typically implicitly absorbed inside t, or otherwise the problem is ill-determined: any $\mu$ mean of $t_i$ appears as b+$\mu$ and hence the variable b cannot be distinguished from b+$\mu$. Therefore, we could implicitly assume the mean of $n_i$ to be zero, and that b will be automatically shifted by the value of $\mu$ (assuming the estimator of b is unbiased; otherwise it will be additionally shifted according to the estimator's bias).

$d_i = \sqrt{(x-x_i)^2 + (y-y_i)^2 + (z-z_i)^2}$ denotes distance in 3D Euclidian space.

TOT Metric and Space-Time Vectors

In the sections discussing space-time vectors, we use $\bar{t}$ to denote the unknown time of transmission, which is equivalent the UE's clock bias b. This is a synchronization variable relative to the localized node or network time. It is illustrated in a 4-dimensional space-time with variables x, y, z, $\bar{t}$. Note that we have normalized the speed of light to c=1, so in fact the unknown time of transmission or clock bias is a distance (time multiplied by the speed of light).

Analogously to $d_i$, we can define the time distance along the time dimension, $\tau_i = \bar{t} - t_i$, where $\tau_i \leq 0$, i.e. $\bar{t} \leq t_i$ since time of transmission normally occurs before time of arrival; except when noise is sufficiently strong to shift time of transmission $\bar{t}$ later than received measurement time $t_i$. $\tau_i$ is a pseudo-distance or pseudo-range since it depends on an unknown time of transmission. Hence, we define the TOT measurement or metric, $$\eta_i^{TDOA} \stackrel{\text{def}}{=} d_i + \tau_i = -n_i$$

Which is the same TOT pseudo-range formula in more compact form (and with speed of light c=1, since time and distances are normalized to the same unit, e.g. to the unit of meters).

Figure 10A:
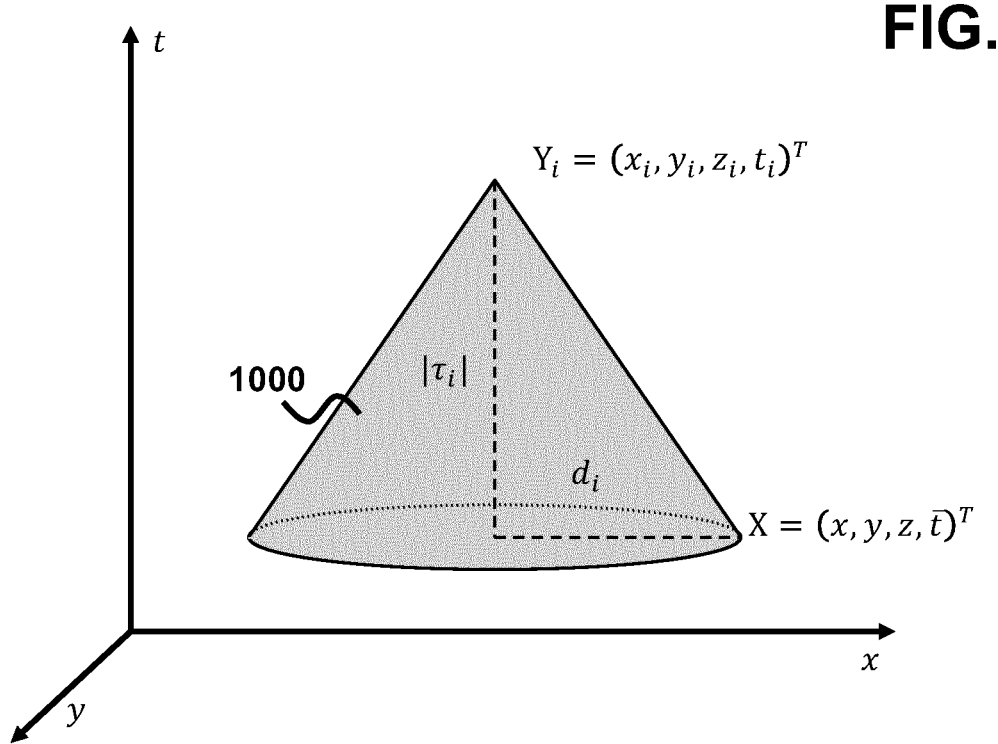
FIGS. 10A-10B are a space-time diagrams illustrating hyper-cones where the apex of each cone represents a measurement observation of a node according to an embodiment of the invention.

As illustrated in FIG. 10A, by representing the vectors in 4D space-time that includes the time dimension, we can write X=(x, y, z, $\bar{t}$)$^T$ the unknown vector or unlocalized node, and $Y_i = (x_i, y_i, z_i, t_i)^T$ the known vectors or measurements from each localized node i. The vector X−$Y_i$ can also be represented in the 2D relative system coordinates $(d_i, \tau_i)^T$. Note that we can also write X=(x, y, z, b)$^T$ where b$\triangleq \bar{t}$ is the UE clock bias.

Observation $Y_i$ defines a hyper-cone 1000 in space-time, and the point X lies on or near the hyper-cone. (space-time is also known by space-range since the time dimension is a pseudo-range dimension $c\tau_i$ with normalized speed of light C=1).

In this space-time representation, the measurement $t_i$ as well as the known coordinates $x_i, y_i, z_i$ are combined to represent a single measurement vector $Y_i$, where each component can be noisy including the known node's position coordinates $x_i, y_i, z_i$ (but typically with much smaller noise than the noise observed on the measurement $t_i$). Note that measurement $t_i$ is the time of arrival corresponding to the i-th anchor node and may be calculated either in the anchor node (e.g. uplink reception), or in the unlocalized node (e.g. downlink reception). As stated earlier, in typical situations $\bar{t} \leq t_i$ but when the distance between emitter and receiver is of the order of the noise level, $d_i \sim n_i$, then we may find $\bar{t} > t_i$.

Figure 10B:
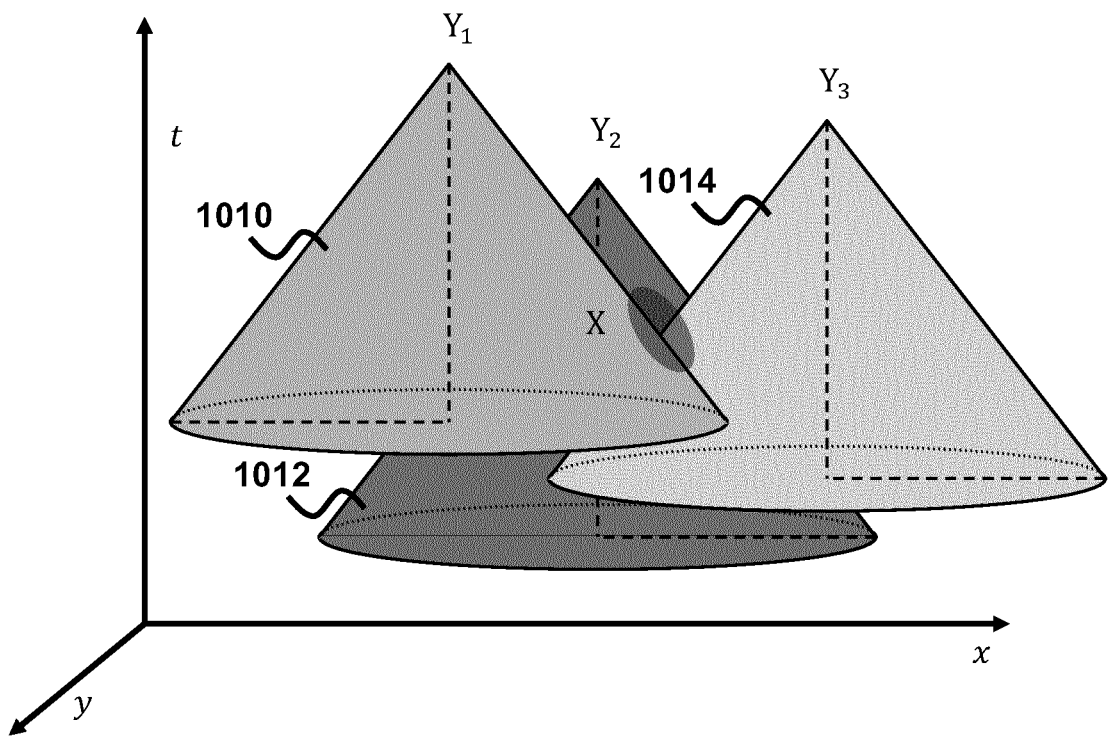

$Y_1, Y_2, Y_3$ are the observations and we look for the point X nearest to all their respective hyper-cones 1010, 1012, 1014, as shown in FIG. 10B. It is clear from the figure that good results, with clearer intersection, are obtained when the unlocalized node X is appropriately surrounded by known nodes (e.g. having their $x_i$ to the left and right of x, not all one side of x).

We denote by tilde the 3D vectors in Euclidian space excluding the time dimension, $\tilde{X}^{(S)} = (x,y,z)^T$ and $\tilde{Y}_i^{(S)} = (x_i, y_i, z_i)^T$.

We also denote the gradient vector of metric $\eta_i^{TDOA}$ by $$J_i = \left( \frac{x - x_i}{d_i}, \frac{y - y_i}{d_i}, \frac{z - z_i}{d_i}, 1 \right)^T$$

Which is a vector in a 2D plane formed by $\tilde{X} - \tilde{Y}_i$ and the $\bar{t}$ axis, and of constant norm $\|J_i\| = \sqrt{2}$. In the 2D relative coordinate system $(d_i, \tau_i)^T$, we have $J_i^{2D} = \sqrt{2}(1,1)^T$ is the bisector vector between the axes carrying, respectively, $d_i$ and $\tau_i$. The metric can also be written as a dot product or projection onto $J_i$, $$\eta_i^{TDOA} = J_i^T (X - Y_i) = d_i + \tau_i = -n_i$$

TOT Seminorm

We define the TOT seminorm $\eta^{TOT}$ by $$\|X\|_{TOT} \stackrel{\text{def}}{=} |\eta^{TOT}| \stackrel{\text{def}}{=} |d + \bar{t}| = |\sqrt{x^2 + y^2 + z^2} + \bar{t}|$$

$$\|X - Y_i\|_{TOT} \stackrel{\text{def}}{=} -\eta_i^{TOT}| = |d_i + \tau_i| = |\sqrt{(x-x_i)^2 + (y-y_i)^2 + (z-z_i)^2} + (\bar{t} - t_i)|$$

The seminorm $\|X - Y_i\|_{TOT} = 0$, i.e $\tau_i = -d_i$, defines, not a single point, but a cone in 4D space-time with a sphere as basis in 3D position space, and the cone is centered at $Y_i$. Hence the denomination seminorm since an ensemble of non-zero vectors has zero norm.

Note that we have defined $d \stackrel{\text{def}}{=} \sqrt{x^2 + y^2 + z^2}$ the distance to origin zero.

Least Squares Solution (L2-Norm Minimization)

The Weighted Least Squares solves the problem $$\min_{\hat{X}} \sum_i w_i \hat{n}_i^2 = \sum_i w_i (\hat{d}_i + \hat{\tau}_i)^2 = \sum_i w_i \|\hat{X} - Y_i\|_{TOT}^2$$

Where the hat denotes an estimated or candidate value. We may optionally add the constraint that $\bar{t} \lesssim t_i$ for all or most measurements, which may detect certain invalid solutions.

The gradient of the weighted LS cost function at some candidate position $\hat{X}(\hat{x}, \hat{y}, \hat{z}, \hat{t})$, with the vector $\hat{X}-Y_i$ also characterized by the two coordinates $\hat{d}_i, \hat{\tau}_i$, is $$\sum_i w_i \hat{n}_i \hat{J}_i$$

I.e.

$$\sum_i w_i \frac{\left(\hat{X}^{(S)} - Y_i^S\right)}{\hat{d}_i} \hat{n}_i \text{ for } x, y, z$$

$$\sum_i w_i \hat{n}_i \text{ for } \bar{t}$$

When the candidate is the ideal solution X, all the hats can be removed, therefore the gradients are carried by constant norm $J_i$ and with weight $w_i n_i$. A measurement with strong noise will attract or pull (depending on the sign of $n_i$) the solution with stronger force. To prevent outlier measurements from harmful impact, minimizing the L1-norm instead of L2-norm is preferred.

At the LS solution the gradient is zero, i.e., $$\hat{X}^{(S)} \sum_i \frac{w_i \hat{n}_i}{\hat{d}_i} = \sum_i Y_i^{(S)} \frac{w_i \hat{n}_i}{\hat{d}_i} \text{ for } x, y, z$$

$$\hat{t} \sum_i w_i = \sum_i w_i (t_i - \hat{d}_i) \text{ for } \bar{t}$$

Hence the LS solution for x,y,z is the center of mass of $Y_i^{(S)}$ weighted by $$\frac{w_i \hat{n}_i}{\hat{d}_i},$$

and for $\bar{t}$, it is the center of mass of the weighted estimated time of departure, $t_i - \hat{d}_i$ (transmission time; which is constant if there were no noise).

The weights, and namely the noise estimates $\hat{n}_i = -\hat{d}_i - \hat{\tau}_i$ at the LS solution can be found iteratively until convergence is achieved to a local or global minimum. Convergence is achieved when the position becomes stable and no longer moves as we iterate.

Note, that the usual methods to solve the LS problem use local approximations and are the gradient descent, Taylor expansion of the non-linear term $\hat{d}_i$ ($1^{st}$ order: Gauss-Newton, $2^{nd}$ order: Newton), Levenberg-Marquardt (dampened Gauss-Newton). We will denote such methods by the Taylor expansion methods as they essentially rely on a first or second order linearization of the problem.

Note that the convergence to a global or even to a local minimum of the Taylor expansion methods is not guaranteed as the LS formula can be highly non-linear in the sense that it necessitates higher order expansion if the initial guess is not sufficiently near the local or global minimum. Hence, combining the Taylor expansion method with a regular gradient descent can be useful.

The $1^{st}$ order Taylor expansion method in the vicinity of point $X^o(x^o, y^o, z^o)$ or $(d_i^o, \tau_i^o)$ near the LS solution is given by $$\eta_i^{TDOA} = -\hat{n}_i \approx d_i^o = \tau_i^o + \hat{J}_i^{oT}(\hat{X} - X^o)$$

By vertically concatenating the measurements i into vector $-N = (\eta_i) = (-\hat{n}_i)$, the initial guesses into vector $B^o = (d_i^o = \tau_i^o)$, and the gradient rows into matrix $A^o = (\hat{J}_i^{oT} (\hat{X} - X^o)^T)$ we obtain $$-N = B^o = A^o(\hat{X} - X^o)$$

And the LS Taylor expansion solution to minimize total squared noise norm $N^T N$ (in a given iteration with starting point $X^o$), is $$\hat{X}^{LS\ TAYLOR} = (A^{oT} A^o)^{-1} A^{oT} B^o$$

The Levenberg-Marquardt solution is dampened with factor $\lambda$ to reduce possible oscillations, $$\hat{X}^{LS\ LM} = (A^{oT} A^o + \lambda I)^{-1} A^{oT} B^o$$

Known Time of Transmission

Fixing $\bar{t}$=known constant leads to a TOA problem with known timing rather than a TOT problem. The hyper-cone is reduced to a sphere in the fixed plane $\bar{t}$=known constant. The equations are nearly unchanged except for known $\bar{t}$.

Fixing a Space Coordinate

For example, we can fix z if the height is approximately known. z can be selected to have a few candidate values, or to be constrained to a range of values. At the boundary of z, or when z is fixed, the formulas for x,y,$\bar{t}$ don't change except for known z. Typically, it is enough to select a few candidate values of z.

Minkowski Metric and Global Solution

An alternative to the local Taylor approximation, and in order to directly find the global solution, without any knowledge of an initial guess permitting a local Taylor expansion, we propose to pre-multiply the TOT measurement or metric by $d_i - \tau_i$, i.e., $$d_i + \tau_i = -n_i$$

$$(d_i + \tau_i)(d_i + \tau_i) = -(d_i - \tau_i) n_i$$

$$d_i^2 - \tau_i^2 = -(d_i - \tau_i) n_i$$

Or equivalently to square the left and right-hand sides and obtain the same result, $$-\tau_i = d_i + n_i$$

$$\tau_i^2 = d_i^2 + 2 d_i n_i + n_i^2$$

$$d_i^2 - \tau_i^2 = -(d_i - \tau_i) n_i$$

Which leads to $$(x - x_i)^2 + (y - y_i)^2 + (z - z_i)^2 - (\bar{t} - t_i)^2 = -(d_i - \tau_i) n_i$$

We define the Minkowski metric and Minkowski semi-norm respectively as $$\eta^M = X^T M X = x^2 + y^2 + z^2 - \bar{t}^2$$

$$\|X\|_M^2 = |X^T M X|$$

Where matrix M=diag(1, 1, 1, −1) is a not a positive definite matrix, i.e. the metric $X^T M X$ can be negative. The 0 norm defines, not a single point, but a hyper-cone in the space-time space, $\tau_i = -d_i$ (with the possible additional constraint that $\tau_i \lesssim 0$). It is clearly the same space-time hyper-cone obtained in the previous section. Note that $M^{-1} = M$ in the space of real numbers.

We can further define for some measurement $Y_i$ and corresponding vector $X-Y_i$, the Minkowski metric and seminorm, $$\eta_i^M \stackrel{\text{def}}{=} (X-Y_i)^T M(X-Y_i)$$

$$\|X-Y_i\|_M^2 = |(X-Y_i)^T M(X-Y_i)|$$

In the subsequent sections, we will replace the minimization over noise by a minimization over the Minkowski metric that acts like a modified noise; and optionally compensate for this modified noise by appropriate weighting of the minimization.

Global Solution for Least Squares Using the Minkowski Metric

The Weighted Least Squares (WLS) solution solves the problem of minimum over X of $$\Sigma_i w_i[(d_i-\tau_i)n_i]^2 = \Sigma_i w_i(d_i^2-\tau_i^2)^2 = \Sigma_i w_i(\eta_i^M)^2 = \Sigma_i w_i(\|X-Y_i\|_M^2)^2$$

Where weights $w_i$ depend on external information such as quality of the TOA measurement; such $w_i$ are well-known in the state of the art and there are various methods for finding appropriate $w_i$ per measurement i. We do not need to describe them further.

Global Solution for Least Absolute Deviations (L1-Norm Minimization) Using the Minkowski Metric The weighted Least Absolute Deviations (LAD) problem is minimum over X of $$\Sigma_i w_i|(d_i-\tau_i)n_i| = \Sigma_i w_i|d_i^2-\tau_i^2| = \Sigma_i w_i|\eta_i^M| = \Sigma_i w_i\|X-Y_i\|_M^2$$

Global Solution's Optimal LS or LAD Weights

Since the original (Maximum Likelihood or WLS) problem is $\min_X \Sigma_i w_i n_i^2$ for the L2-norm, or $\min_X \Sigma_i w_i |n_i|$ for the L1-norm, we can recreate the problem using the Minkowski metric, i.e. $\min_X \Sigma_i w_i (\eta_i^M)^2$ or $\min_X \Sigma_i w_i |\eta_i^M|$, by properly reweighting the formulas in order to eliminate the embedded $(d_i-\tau_i)^2$ from the L2-norm Minkowski metric, or $|d_i-\Sigma_i|$ from the L1-norm Minkowski metric.

Hence, we complement the weight $w_i$ by a second multiplicative weight, $1/(d_i-\tau_i)^2$ for the Least Squares problem (L2-norm), or $1/|d_i-\tau_i|$ for the L1 norm problem. If we apply these extra weights, we eliminate the extra terms resulting from using the Minkowski metric, and we find the original LS or LAD problems used by the local Taylor solution.

In other words, the methods using the Minkowski metric $\eta_i^M$ can be equivalent to the original methods using $n_i$ if proper weights are used, and that essentially undo the multiplication by $(d_i-\tau_i)$.

Note that $d_i-\tau_i \approx 2d_i$ if noise $n_i$ is small relative to distance $d_i$. Hence, the optimal weights $$w_i \approx \frac{1}{d_i^2}$$

for LS or $$w_i \approx \frac{1}{d_i}$$

for LAD.

Minkowski Metric's LS Efficient Solutions

The Minkowski metric methods can provide a global solution or an initial global guess before subsequent iterations using local Taylor expansion.

Assuming approximate weights in some iteration, or unity weights in a first iteration (which is often not too wrong an assumption):

$$w_i \approx \frac{1}{d_i^2};$$

if the distances to the unlocalized node $d_i$ are roughly the same, therefore $w_i$ are roughly the same) then the Weighted Least Squares Minkowski metric method can be approximately solved in closed form, $$(X-Y_i)^T M(X-Y_i) = -(d_i-\tau_i)n_i$$

$$2Y_i^T MX - u = Y_i^T MY_i + (d_i-\tau_i)n_i$$

With the additional new variable and constraint $u=X^T MX$.

By concatenating all the rows $2Y_i^T$ vertically into matrix A, the scalars $Y_i^T MY_i$ into vector B, the noise scalars $n_i$ into vector N, and the scalars $(d_i-\tau_i)^2$ into diagonal noise covariance matrix C, we can write for the set of equations, $$AMX - u\mathbf{1} = B + C^{1/2}N$$

$$A'X' = B + C^{1/2}N$$

With the concatenations $A'=(AM, -1)$, $X'=(X\ u)^T$, and vector $\mathbf{1}=(1\ 1\ 1\ \ldots\ 1)^T$ of length equal to number of observations.

The formula is linear in the variable vector $X'$, provided we consider or neglect the additional constraint $u=X^T MX$. The space-time has been increased by one dimension carrying u, although the solution is bounded to a 4D hyper-cone in this space (the constraint). We denote this increased space by "augmented space-time" (5D).

The Weighted Least Squares problem is given by, $$\min_{X'} (A'X' - B)^T W(A'X' - B)$$

$$\text{subject to } u = X^T MX \to x^2 + y^2 + z^2 - \bar{t}^2 - u = 0$$

Minkowski Metric's LS Unconstrained Solution (Improved Spherical Interpolation Over [1])

A fast solution to the Minkowski metric L2-norm minimization—analogous to the well-known Spherical Interpolation (SI) method, [1-3] but without using a reference anchor node (TDOA)—ignores the hyper-cone constraint $u=X^T MX$ to obtain the linear Weighted Least Squares as a pseudo-inverse, $$\hat{X}^{SI} = (A'^T W A')^{-1} A'^T WB$$

With matrix W the diagonal of some weights $w_i$.

The more we have observations, the more there are rows (dimensions) in the matrices and vectors, and hence the more the ability to "nullify or cancel" the interference from the undesirable variable u carried by the last column in A, which is the all-ones vector, 1 (while x, y, z, $\bar{t}$ are carried by the first 4 columns in A); u is undesirable in this case because it is source of noise since we have ignored the conic constraint $u=X^T MX$. We have estimated u as a free running variable although it isn't.

In a second or more iterations, the weights are better known and the solution can improve. Once we reach an acceptable approximate solution, a second step can be applied for a more accurate solution.

But there are scenarios where we never reach an acceptable solution using this method: e.g. if the useful first 4 columns in A are not sufficiently orthogonal to the all-ones vector carrying u then the solution could be substantially noisy (interference from an improperly estimated u).

We denote this solution by TOT SI.

Minkowski Metric's LS Intersection Solution (Improved Spherical Intersection Over [4])

Another simple and low-cost solution to the Least Squares of the Minkowski metric is obtained by solving the problem in two steps as if they were disconnected steps: solve the linear Least Squares problem (x, y, z, t̄) for a given u, i.e. as a function of u, in the space-time subspace, then find those u that happen to also fit the constraint; and pick what appears to be the best one. This is analogous to the Spherical Intersection (SX) method in the literature but without reference anchor node (TDOA), $$AMX = B + u1 + C^{1/2}N$$

$$\hat{X} = M(A^T WA)^{-1} A^T W(B + u1) = H(B + u1)$$

With $H=M(A^T WA)^{-1} A^T W$. In the second step, we replace $\hat{X}$ by its value in the constraint $u=X^T MX$ to obtain $$u = (B+u1)^T H^T MH(B+u1) = (B+u1)^T W'(B+u1)$$

$$1^T W'1 u^2 + (21^T W'B + 1)u + B^T W'B = 0$$

The "lucky" u that fit the constraint are the solutions to this second-degree polynomial in u. There may exist up to two values for u, which enable us to find $\hat{X}^{SX}$. The preferred value of u is the one that is nearest to the optimal solution if it is approximately known. Or the one that better satisfies t̄≤$t_i$.

We denote this solution by TOT SX. It is suboptimal because, for a given u, we project on the corresponding "full" space-time subspace instead of projecting on the "constraint" within that subspace. Hence, we obtain a solution $X_o^T MX_o = u_o$ that may or may not lie on the constraint ($u_o = u$ or $u_o \neq u$). The two detected values are those "lucky" ones that happen to fall on the constraint ($u_o = u$); and they are not necessarily optimal.

Nevertheless, in the absence of noise, one of the obtained values is the optimal one (because the problem has an exact solution); and hence, for weak noise (relative to distances $d_i$), one of the obtained values will be near optimal. But this solution fails when the noise is not weak relative to distances, in particular when the unlocalized node is near one of the anchor nodes.

When the number of equations equals the number of variables, or in the absence of noise, an exact solution can be simply derived from the above formulae of the Spherical Intersection. In this case, we can ignore the weight matrix W, and for a square invertible matrix A, we have $H=MA^{-1}$, and $W'=H^T MH = A^{-T} MA^{-1}$. The solution to the problem is straightforward with a second order degree polynomial in u to solve, and having 0, 1 or 2 possible, noise-free, exact solution. A similar solution was found in [8]. The weakness of the TOT SX solution is that it does not solve the full LS problem for a number of equations larger than the number of variables as it neglects the intermediate parameter u within the LS minimization. The parameter u is sub-optimally simplified to a constraint to intersect with, and any intersection will do. With our TOT SI or TOT CSI (introduced next) we solve a minimization problem involving all unknown quantities including an optimization over the intermediate parameter u. As the number of equations increases or as the noise increases the SX solution tends to underperform TOT SI and TOT CSI.

Minkowski Metric's LS Constrained Spherical Interpolation (Improved CSI Over [5], [6])

To find the constrained solution of the Spherical Interpolation formulation, analogously to the method with reference node (TDOA) [5], [6], we can use the Lagrange multipliers; or equivalently project directly onto the constraint (rather than on the full subspace of the constraint as was done for SX); or undo the constraint and find the zero gradient in 4D (eliminating u and replacing it by its value $X^T MX$).

In any case, the solution is still suboptimal since it depends on knowing the correct weights $$\left(\text{e.g. } w_i \approx \frac{1}{d_i^2}\right).$$

Using the Lagrange multipliers method, $$\min_{X'}(A'X' - B)^T W(A'X' - B)$$

$$\text{subject to } u = X^T MX \rightarrow X'^T M'X' - 1_u^T X' = 0$$

where M'=diag(1,1,1, −1,0) is non-invertible, $1_u = (0,0,0,0,1)^T$ is the unitary vector in the dimension of the variable u, and the Lagrange multiplier λ is given by $$(A'^T WA' + \lambda M')X' = A'^T WB + 0.5\lambda 1_u$$

I.e.

$$X' = (A'^T WA' + \lambda M')^{-1}(A'^T WB + 0.5\lambda 1_u)$$

$$X'^T M'X' - 1_u^T X' = 0$$

$$A'^T WA' + \lambda M' \succcurlyeq 0$$

Where, as discussed in detail in [6], equations (20)-(22) for the non-TDOA problem, the last equation denotes that the matrix to be inverted should be positive semidefinite, i.e.

$$\lambda \in \left[-\frac{1}{\gamma}, \infty\right]$$

Where γ is the strongest generalized eigenvalue of the matrix pair (M', $A'^T WA'$). Over this interval, the constraint is $X'^T M'X' - 1_u^T X'$ is strictly decreasing as a function of λ, and therefore a simple bisection algorithm can be used to find the best λ in this interval that satisfies the constraint equal to 0, and therefore $\hat{X}'^{CS}$.

The case of $$\lambda = -\frac{1}{\gamma},$$

non-invertible matrix, can be treated separately (known $\lambda$) or ignored since it rarely occurs.

The problem, however, requires a certain number of matrix inversions (usually of size 5×5) during the search for the optimal $\lambda$, and can be costly to implement in an embedded system.

In order to reduce complexity, we can diagonalize the matrix to be inverted as was done in [5]. However, in our case, matrix M' is non-invertible. To solve this issue, we separate the 5th dimension from the space-time dimension via block matrix inversion, or by rewriting the formulas in 4D space as follows, $$\min(AMX-u1-B)^T W(AMX-u1-B)$$

subject to $u=X^T MX$

Using the Lagrange multipliers method, we obtain the set of 3 equations (differentiate with respect to X and with respect to u), $$MA^T W(AMX-u1-B)+\lambda MX=0$$

$$1^T W(AMX-u1-B)=\lambda$$

$$X^T MX=u$$

The first equation provides X as function of u, $\lambda$.

$$\hat{X}=(A^T WAM+\lambda I)^{-1} A^T W(B+u1)$$

In order to simplify the matrix inversion, since M is invertible in this reformulation, we use, similarly to [5] the Eigen decomposition $A^T WAM=VDV^{-1}$, or $MA^T WA=V^{-T}DV^T$, hence $$\hat{X}=V(D+\lambda I)^{-1} V^{-1} A^T W(B+u1)$$

$$\stackrel{\text{def}}{=} L(B+u1)$$

With $L \stackrel{\text{def}}{=} V(D+\lambda I)^{-1} V^{-1} A^T W$. The matrix to invert as a function of $\lambda$ is now a diagonal matrix, efficiently computed.

For a given $\lambda$ in the previously determined interval $$\lambda \in \left[-\frac{1}{\gamma}, \infty\right),$$

we find u from $$1^T W(AML-I)(B+u1) = \lambda$$

$$u = \frac{\lambda - 1^T W(AML-I)B}{1^T W(AML-I)1}$$

And then we check if it satisfies the strictly decreasing constraint $$\hat{X}^T M\hat{X}-u=\hat{X}^T M'\hat{X}'=0$$

Via a bisecting algorithm over $\lambda$.

We have eliminated a costly matrix inversion.

Algorithm Listing

Create the measurement vectors $Y_i=(x_i, y_i, z_i, t_i)^T$ per cell i, containing the cell position and the estimated TOA from the cell.

Concatenate all the rows $2Y_i^T$ vertically into matrix A.

Set matrix M=diagonal(1, 1, 1, −1) and M'=diag(1,1,1,−1,0).

Concatenate all scalars $Y_i^T MY_i$ vertically into vector B.

Set matrix A'=(AM, −1); with vector 1=(1 1 1 . . . 1)$^T$ of length equal to number of observations.

Compute $\gamma$, the strongest generalized eigenvalue of the matrix pair (M', A'$^T$WA')

Set the diagonal elements of weighting matrix W to $$W_{i,i} = \frac{w_i}{(d_i - \tau_i)^2} \quad \text{(or } W_{i,i} = \frac{w_i}{|n_i||d_i - \tau_i|}$$

for an L1-norm). Cf. clarification note below on weight $w_i$.

Find the Eigen decomposition of typically 3×3 or 4×4 square matrix $A^T WAM=VDV^{-1}$.

Define the unknown position and time of transmission vector to be estimated by $\hat{X}=(x, y, z, \hat{t})$.

Let $\lambda$ be an intermediate unknown variable to be determined in the interval $$\lambda \in \left[-\frac{1}{\gamma}, \infty\right).$$

For example, using a bisecting algorithm (the constraint function is strictly decreasing over the interval).

For each iteration with a hypothesis on the value of $\lambda$:

Compute matrix $L \stackrel{\text{def}}{=} V(D+\lambda I)^{-1} V^{-1} A^T W$ and scalar $$u = \frac{\lambda - 1^T W(AML-I)B}{1^T W(AML-I)1}.$$

Compute vector $\hat{X}=V(D+\lambda I)^{-1} V^{-1} A^T W(B+u1)$.

Check if it satisfies the strictly decreasing constraint $\hat{X}^T M\hat{X}-u=0$ Stop iterations (e.g. of the bisecting algorithm) if the constraint is approximately satisfied (to the desired accuracy on $\hat{X}$).

The CSI solution described in this listing provides an estimate of the position using a global solution. Nevertheless, given that appropriate weights for the Minkowski metric minimization are of the form $$\frac{1}{(d_i - \tau_i)^2} \approx \frac{1}{d_i^2}$$

and therefore dependent on the unknown final position estimate, we still need to iterate if we wish to take such weights into account for improved accuracy.

After the first iteration where the Minkowski related weights can be assumed constant equal to 1, we can perform a second iteration with updated Minkowski weights based on the first obtained position and pseudo-range estimate.

The weight $w_i$, per observation, corresponds to the usual weighted LS or weighted LAD (or other norm) weights; e.g. to achieve Maximum Likelihood, we can use as weight $w_i$ the inverse of the noise variance for the LS criterion assuming Gaussian noise, or the inverse of the noise standard deviation of the LAD criterion assuming Laplacian noise (due to multipath). The remaining factor in the weight $W_{i,i}$ (i.e. the term $$\frac{1}{(d_i - \tau_i)^2} \text{ or } \frac{1}{|n_i||d_i - \tau_i|})$$

corresponds to a correction term for the Minkowski metric's modified noise statistics. As it depends on the knowledge of the position and time of transmission, it may be set to 1 initially, or to a value corresponding to a vaguely known position.

In essence, the CSI is a method to calculate the location of a receiving node using a closed-form global least squares solution for the TOT problem, with approximate weights, the method comprising:
(a) estimate one or more TOAs from a plurality of transmitting nodes
(b) set the diagonal elements of a weighting matrix
(c) compute the strongest generalized eigenvalue of a matrix pair, the matrix pair comprising at least the estimated TOAs, known cell positions and the weighting matrix
(d) define an intermediate unknown variable to be determined in an interval
(e) compute a vector based in part on a hypothesis value of the intermediate unknown variable, estimated TOAs, known cells positions and the weighting matrix
(f) repeat step (e), based on an iteration of the hypothesis value of the intermediate unknown variable until a constraint is satisfied
(g) optionally, repeat steps (b) to (f) with updated weights to account for the modified noise statistics or to converge toward a LAD solution (using IRLS iterations, for example, as detailed in a subsequent section)

Figure 7:
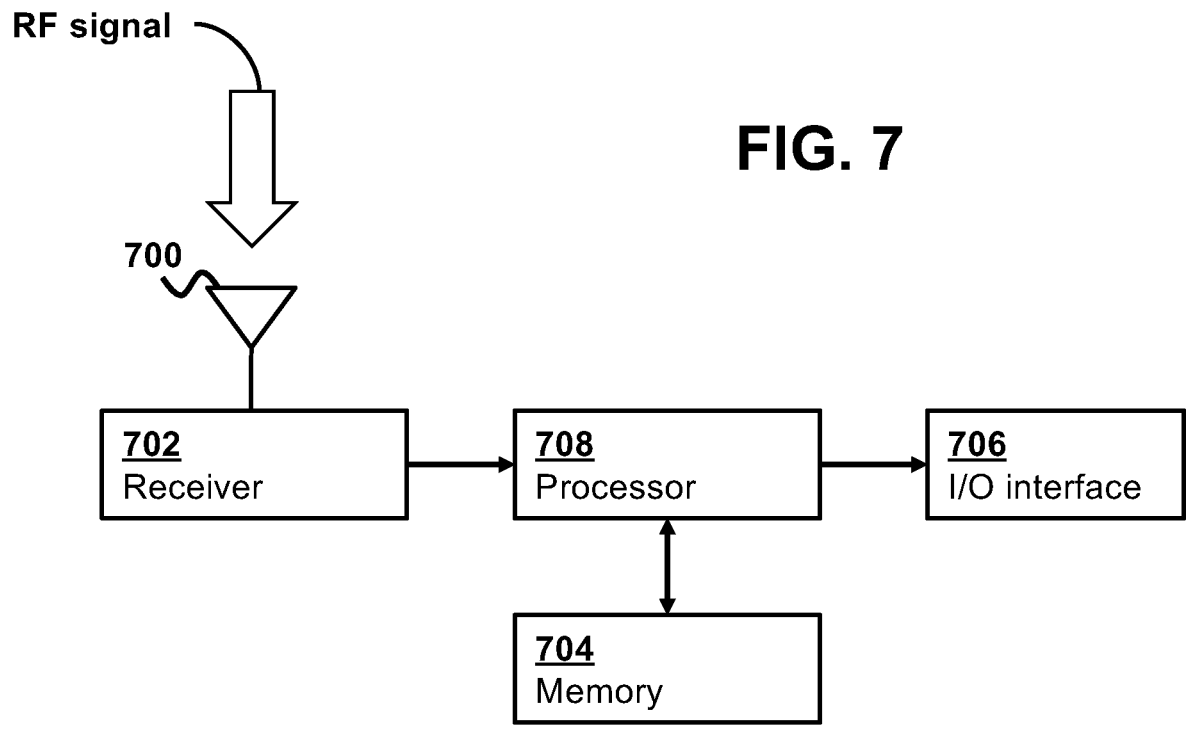
FIG. 7 is a schematic diagram of a receiving node (or UE) according to an embodiment of the invention.
Figure 8:
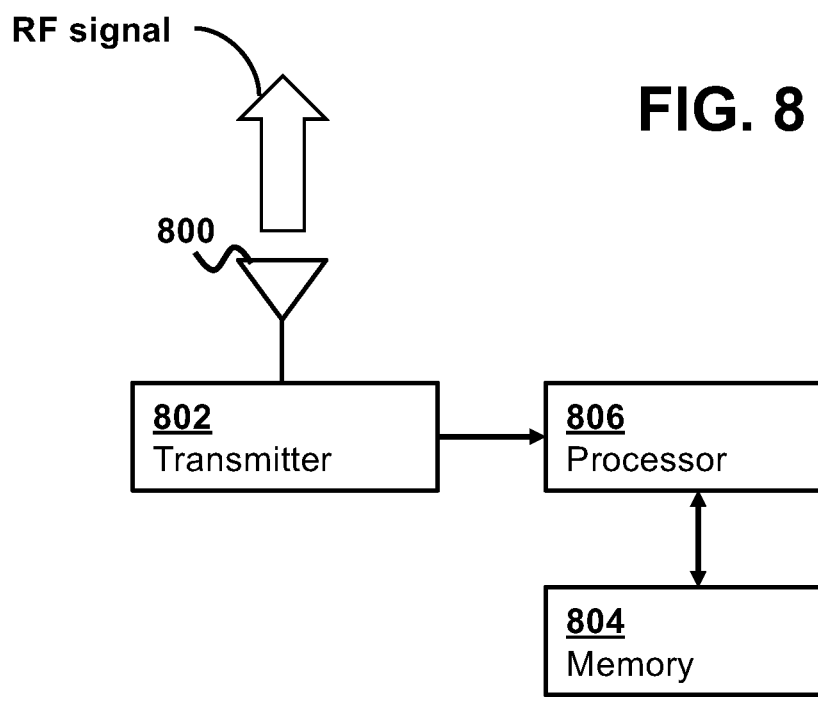
FIG. 8 is a schematic diagram of a transmitting node according to an embodiment of the invention.

For the purposes of clarity, the following definitions and examples may be used in reference to the section above. A receiving node (or UE) is a physical device comprising an antenna 700, receiving system 702, memory 704, I/O interface 706, and processing unit 708 such as that shown in FIG. 7, for example a mobile phone, a laptop or a GPS tracking device. A transmitting node is a physical device comprising an antenna 800, a transmitting system 802, memory 804 and a processing unit 806 such as that shown in FIG. 8, for example a GPS satellite, LTE base station or WiFi access point. The actions associated with the method above may be performed by the processing unit in the receiving node. Alternatively, one or more of the actions may be performed by a different node, communicatively coupled to the receiving node. For example, a receiving node (UE) such as a mobile phone may perform step (a), communicate the results to an LTE base station, cloud server or other processing unit, which then completes steps (b) through (f).

IRLS Method

The known Iterative Reweighted Least Squares method enables updating the position dependent weights such as the Minkowski related weights $$\frac{1}{(d_i - \tau_i)^2}$$

for L2 or $$\frac{1}{|d_i - \tau_i|}$$

for L1 (which depend on distance and measured pseudo-range between base station and UE) at each iteration as the problem converges toward the global solution. For the LS solution, at each iteration we write $$\min_X \sum_i w_i n_i^2 \rightarrow \min_X \sum_i \frac{w_i}{(d_i - \tau_i)^2} (\eta_i^M)^2$$

Where we can then find the global LS solution using the noise metric $n_i$ via an LS problem using the Minkowski metric with known closed form solution, and iteratively reweighting it with $$\frac{1}{(d_i - \tau_i)^2}$$

in order to undo the metric's multiplication by $d_i - \tau_i$ with respect to $n_i$.

We may alternatively solve a global Least Absolute Deviations (LAD or L1 norm) problem by also reweighting the noise, at each iteration, such that we minimize a problem with $|n_i|$ instead of $n_i^2$, namely, $$\min_X \sum_i w_i |n_i| \rightarrow \min_X \sum_i \frac{w_i}{|n_i|} n_i^2 \rightarrow \min_X \sum_i \frac{w_i}{|n_i||d_i - \tau_i|} |\eta_i^M|$$

Hence, at each iteration, by updating the weight to include the noise dependent and the Minkowski dependent weight, $$\frac{w_i}{|n_i||d_i - \tau_i|},$$

we can approximate a LAD global solution by using a reweighted LS solution of the Minkowski metric with known closed form solution at each iteration.

The weights, per iteration, are incorporated into the diagonal of the weighting matrix W described in the Minkowski metric solutions.

Such iterative solution requires an initial guess, however, in order to find the position and noise dependent weights. The initial guess can be obtained by assuming constant weights for all unknown weights. For example, all unknown weights are initially set to 1, unless prior information on them is known; for instance, some information on distance may be known from received signal strength or from a vaguely known position.

The number of iterations may be prefixed, or iterations could stop when the estimated position stabilizes, or when the estimated residual noise is small with respect to the desired accuracy.

The method may iterate one time or a fixed number of times using the Minkowski metric minimization until we reach an approximate position. At that point, we may replace the iterations by regular local Taylor expansion iterations (replacing $\eta_i^M$ by $n_i$ and ignoring the Minkowski multiplier $(d_i - \tau_i)$. The advantage of the local Taylor expansion is reduced complexity per iteration relative to the Constrained SI (CSI); but it has the drawback that it needs a sufficiently close initial guess while the CSI method using the Minkowski metric is far less sensitive to the initial guess.

The Taylor expansion iterations are also applicable to LAD by incorporating the weight $1/|n_i|$ as stated for the Minkowski solution; this is IRLS using Taylor expansion to achieve a LAD solution.

Intermediate Iterations on Unknown Time of Transmission

The formulas are linear in the unknown time of transmission or clock bias, namely, each observation is $-\tau_i = d_i + n_i$, i.e. $t_i = d_i + \bar{t} + n_i$.

Therefore, during IRLS iterations (or equivalent methods), we may insert some intermediate special iterations where the unknown variable $\bar{t}$ is quickly estimated assuming the remaining variables x,y,z are known (given their current values in the current iteration). This is shown in FIG. 6A-B.

Figure 6A:
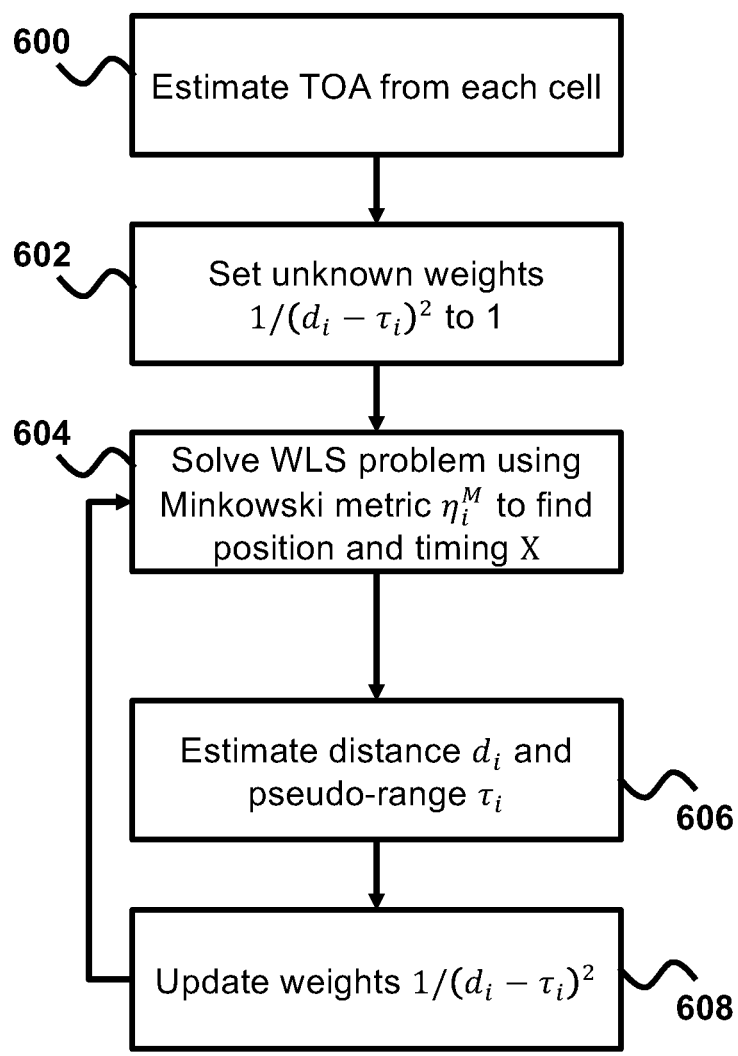
FIG. 6A and FIG. 6B, are flowcharts illustrating the technique for solving the global LS problem via IRLS and global LAD problem via IRLS, respectively, according to an embodiment of the invention.

The technique for the global LS problem via IRLS is shown in FIG. 6A, where step 600 estimates TOA from each cell, step 602 sets unknown weights, step 604 solves the WLS problem using Minkowski metric to find position and timing (stopping after a fixed number of iterations or when the result stabilizes, optionally continuing with Taylor expansion iterations), step 606 estimates distance and pseudo-range, and step 608 updates weights. Optionally, after updating weights, the TOT $\bar{t}$ is improved as weighted mean of $t_i - d_i$.

Figure 6B:
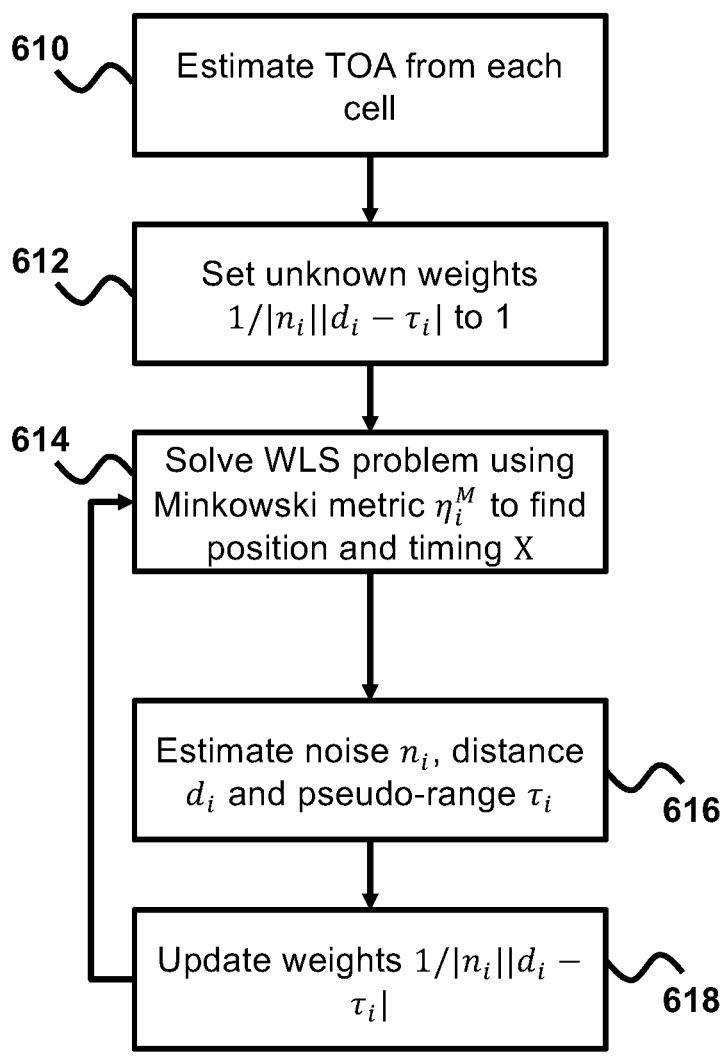

The technique for the global LAD problem via IRLS is shown in FIG. 6B, where step 610 estimates TOA from each cell, step 612 sets unknown weights, step 614 solves the WLS problem using Minkowski metric to find position and timing (stopping after a fixed number of iterations or when the result stabilizes, optionally continuing with Taylor expansion iterations), step 616 estimates noise, distance and pseudo-range, and step 618 updates weights. Optionally, after updating weights, the TOT $\bar{t}$ is improved as weighted median of $t_i - d_i$.

In this case, for the LS problem, the value of $\bar{t}$ is immediately obtained as the weighted mean over index i of the observations $t_i - d_i$. In this case, the weight is simply $w_i$ since this is not a Minkowski metric type of minimization but a regular LS problem.

For the LAD problem, the value of $\bar{t}$ is immediately obtained as the weighted median over index i of the observations $t_i - d_i$. In this case, the weight is simply $w_i$ since this is not a Minkowski metric type of minimization but a regular LAD problem.

Inserting such intermediate steps in the IRLS iterations procedure where $\bar{t}$ is improved given fixed x, y, z can speed up convergence, and in particular it may prevent falling into a local minimum. This intermediate step may also be inserted in between Taylor expansion iterations, since the problem is similar with the formula linear in E; it can also improve the convergence of the Taylor expansion method.

Fixing a Space Coordinate

If, for example, the height z is (approximately) known, we can fix z and move it to the side of the observations rather than the unknowns. In this case, the unknowns are x, y, $\bar{t}$. In the Minkowski formulation, we remove the dimension z as a variable, and we remove anchor (cell) coordinate $z_i$ from matrix A and insert its contribution into the observations vector B. The Minkowski formulation $$(x-x_i)^2 + (y-y_i)^2 + (z-z_i)^2 - (\bar{t}-t_i)^2 = -(d_i-\tau_i)n_i$$

is written as $$(x-x_i)^2 + (y-y_i)^2 - (\bar{t}-t_i)^2 = -(z-z_i)^2 - (d_i-\tau_i)n_i$$

and $$2Y_i^T MX - u = Y_i^T MY_i + (d_i-\tau_i)n_i$$

is written as $$2Y_i^T MX - u = Y_i^T MY_i - (z-z_i)^2 + (d_i-\tau_i)n_i$$

Hence, vector B includes $-(z-z_i)^2$, and the remaining matrices and vectors are shortened by removing the z dimension.

Various other algorithms, or a mixture of algorithms, can be used to solve the problem for LS, LAD or other norms, such as: simplex algorithm, interior point method, gradient descent, grid search, etc. With the option of including the non-linear constraint (u) function of the unknown position and time of transmission; the constraint is possibly linearized locally. In an alternative implementation, the solution is first found without the constraint (similar to aforementioned Spherical Interpolation), and in a second step the constraint is included, either globally or with local linearization, to improve the solution.

Comparison with State of the Art TDOA Global Linearization

As mentioned previously, the global linearization model for TOT is obtained by squaring $$-\sigma_i = d_i + n_i$$

$$\sigma_i^2 = d_i^2 + 2d_i n_i + n_i^2$$

$$(t_i - \bar{t})^2 - d_i^2 = 2d_i n_i + n_i^2$$

with $\tau_i =$. We can use the same model to write the analogous formula for the TDOA global linearization by subtracting the TOA estimate $t_0$ of a reference node, which eliminates $\bar{t}$; or by replacing $\bar{t}$ by $t_0 - d_0 + n_0$ as if the time of transmission is mainly determined by the first TOA estimate, to obtain before and squaring $$t_i - t_0 + d_0 = d_i + n_i - n_0$$

$$(t_i - t_0 + d_0)^2 - d_i^2 = 2d_i(n_i - n_0) + (n_i - n_0)^2$$

The noise term for the TOT case is $n_{TOT} = 2d_i n_i + n_i^2$, and for the TDOA case, $n_{TDOA} = 2d_i(n_i - n_0) + (n_i - n_0)^2$. In addition to correlated or colored noise, $n_0$, across all observations and that is difficult to whiten due to the squared term, the noise statistics are further complicated if the statistics of $n_0$ and $n_i$ are non-Gaussian (e.g. Laplacian, which often occurs in scenarios with multipath), and there can be noise enhancement especially when $n_0$ is an outlier. If $n_0$ is an outlier or is large, iterative processing is further complicated by the fact that the initial guess can be quite off the mark.

Furthermore, if an assumption is made that the TOA estimate $t_0$ for the reference node is typically less noisy than the TOA estimates for the remaining nodes; or if at least one node's corresponding TOA estimate is identified as less noisy than other estimates and then this node is used as reference node in the TDOA multilateration problem; implying that the time of transmission $\bar{t} \approx t_0 - d_0$ (i.e. $n_0 \ll n_i$) is not the correct solution. The correct solution is to use the TOT solution and to correctly weight each observation based on some a priori information on the quality of the estimate. All observations are therefore treated similarly with the weight of each determining its quality.

LTE OTDOA Measurements

The issue with using TOT multilateration is the drift of the time of transmission over time if measurements are not made within a short duration (e.g. within tens of milliseconds). TDOA sub-optimally resolves this problem by assuming a different and unrelated TOT per short duration group of measurement, and subtracting and eliminating each unknown TOT within each group of measurements. However, this results in the loss of valuable information, especially when the total number of observations is small.

In our improved solution, the UE may find a relationship between the TOT of each group, then use this relationship to perform TOA estimate compensation; or it may transmit new information to the network or location server enabling it to perform the TOA compensation itself. Once TOA are compensated for timing drift then they can appear as a unique group with a unique TOT. We avoid the loss of information and improve multilateration accuracy.

New information reported to the location server may include estimated clock error and Doppler(s) estimated by the UE and/or by the base station. Such information enables estimating the time drift between groups of TOA or RSTD measurements (cf. FIG. 4 and FIG. 5) and relating all equations to a unique clock bias after undoing time drift; therefore, we reduce the number of unknowns or equivalently increase the number of equations for improved positioning accuracy.

Since the measurements of TOA for each of the N different cells can be spread over time sometimes by more than one second, in different measurement groups, the UE clock can drift substantially between measurements of different groups. Even if Doppler error is corrected, the clock timing drift is usually not corrected in LTE except for tracking of PSS/SSS signals, for example, which has quite an inaccurate timing. For example, if the UE clock drift error is around 2 ppm then within 1 second the drift is 600 m, possibly compensated to about 300 m by tracking PSS/SSS. To reduce the 300 m error or so, in the current state of the art, the UE may continuously remeasure the reference cell's TOA (i.e. $t_0$) before measuring another cell's TOA (i.e. $t_i$), or a sub-group of cell's TOA that are measured within a very short period of time; e.g. within 10 ms before clock drift is substantial.

However, in today's standard, the UE only reports the RSTD and does not report the (multiple) TOA estimations of the reference cell as well as Doppler estimates. Useful information is lost in the process.

Indeed, if the UE would also report its clock drift error, which it knows by measuring the Doppler error, possibly up to a precision of 10 ppb to 100 ppb then we know the clock drift of the reference cell is limited to about 3 m/s for 10 ppb, and 30 m/s for 100 ppb (in a first approximation, we neglect the UE's movement). Therefore, the UE may report the Doppler error, or it may itself estimate as accurately as possible the clock drift based on instantaneous Doppler measurements.

Once the clock drift has been compensated for, either by reporting Doppler(s) over time or by correcting it locally within the UE, then a second measurement of the reference cell's TOA is either unnecessary or, if it is performed, it can be used as an additional observation for increased accuracy.

More formally, given the clock drift, we may write the TOA equations as follows:

$$t_i = \frac{d_i}{c} + t_m(t) + n_i$$

where the UE's clock bias $t_m(t)$ is a function of time relative to the cells timing; it is not a constant bias b. The time t is the clock time within the UE. All estimations of TOA, Doppler, time corrections, etc. should be timestamped with the UE time t when the estimation was performed. Certain estimates vary as a function of time t; for example, TOA $t_i$ is a function of $t_m(t)$ and hence is a function of time t. If TOA $t_i$ is re-estimated at a future time t' then the observation will be $$t'_i = \frac{d_i}{c} + t_m(t') + n'_i,$$

i.e. we observe a drift in the estimate $t'_i$ with respect to $t_i$ (as well as a different noise value). The distance $d_i$ may also drift as function of time t if the UE is moving relative to the transmitting antenna.

If a linear model can be used for the timing drift, then $$t_m(t) = at + b$$

i.e. there is a linear drift of the UE's clock bias over time. The Doppler or clock drift error is given by $$D(t) = \frac{dt_m(t)}{dt} = a$$

In this case, we can estimate approximately a by measuring the Doppler, usually using the reference cell's signal. The Doppler will vary with phase noise (non-linear timing drift) but we may assume that the phase noise is small relatively to the desired accuracy. The constant clock bias parameter b cannot be measured via the Doppler; it is to be jointly estimated, together with the UE's position, inside the multilateration solver; it's the usual unknown clock bias. The term at is known since we know a from the Doppler, and t is the elapsed time between two measurement groups.

Then we have the compensated TOA measurements given by compensated $$TOA_i = t_i - at = \frac{d_i}{c} + b + n_i$$

i.e. the TOA measurements $t_i$ are corrected by the clock drift at where t is the elapsed time between groups of measurements. In the special case where all measurements are performed simultaneously, we can use t=0. These equations with compensated TOA are then merged into a unique measurement group to form a regular multilateration problem with a unique clock bias b. We have therefore managed to reduce the number of unknowns to the unique b assuming we can estimate the time drift from regular Doppler measurements.

We may remeasure the reference cell TOA, if we wish to increase accuracy and if it's not costly to do so, and then we can add its equation to the set of equations, just like a regular cell. In other words, a reference cell no longer possesses any special treatment except that it may be measured a few more times to improve accuracy.

By doing so, we have increased the number of equations and improved the estimation of the reference cell. The remaining cells' TOA estimates may also be improved by performing more than one measurement for each of them and including these measurements as additional equations in the multilateration problem. It is, for example, an option to rotate the designated reference cell and let other cells be denoted by reference cell in order to provide more measurements for various cells, and not just for the original reference cell.

In the Doppler (and clock drift error) estimation formula, $$D(t) = \frac{dt_m(t)}{dt} = a,$$

we note that Doppler may change when measured at different times t. We then either consider (and report) the average Doppler a over time, hence the previously mentioned linear model for the time drift, at+b; or we may model the Doppler as linearly changing, D(t)=a't+a, e.g. due to sudden vehicle acceleration or deceleration, and therefore the time drift is a second order polynomial, $$t_m(t)=a't^2+at+b$$

If the UE's Doppler formula is a higher order polynomial, e.g. due to sudden acceleration or deceleration, at least two measurements of Doppler need to be performed over time and taken into account or reported in order to calculate a' and a. We may fit the Doppler measurements at various times t to the model $$D(t)=2a't+a$$

in order to find a',a using any fitting method (Least Squares or other). Then the reported TOA measurements could be pre-corrected for the time drift as follows: compensated $$TOA_i = t_i - a't^2 - at = \frac{d_i}{c} + b + n_i$$

i.e. clock drift corrected TOA. Or the parameters a', a are reported to the location server, which performs the necessary corrections. Assuming the UE will correct for Doppler error, then there is no need to report the Doppler measurements or the Doppler model's parameters a', a; but at the minimum, the LPP OTDOA protocol can be augmented to report all measured TOA of the reference cell, which is currently not done.

Critically, the UE may perform clock corrections in between measurement groups, independently of the positioning procedure. For example, while tracking the PSS, SSS or CRS, the UE may perform a clock correction at some point. Such clock correction should be accounted for in the TOA compensation since it modifies the value of the function $t_m(t)$. Therefore, the correct formula for the time drifting function is $$t_{mc}(t)=t_m(t)-t_c(t)=a't^2+at+b-t_c(t)$$

where $t_c(t)$ is the function of "accumulated" intermittent clock corrections in the UE; e.g. if the UE corrects its clock by ±1 sample at some time instant, this function accounts for such corrections in order to exclude them when computing the time drift based on integrated Doppler. A further generalized version of the time drift is function of the approximately integrated Doppler, $$t_{mc}(t)=\int D(t)dt+b-t_c(t)$$

If the Doppler estimates are reported to the base station, the accumulated intermittent clock corrections $t_c(t)$ should also be reported. Care should be taken when estimating Doppler in the UE in the vicinity of a clock correction in the UE; there is an additional phase rotation to be accounted for when the clock is corrected by 1 or more samples.

Note that the clock corrections will tend to cancel or reduce the timing drift due to Doppler. Indeed, the LTE receiver will track the signals of a serving base station, with some accuracy, and correct for the timing drift to some extent. For example, if the timing drift due to Doppler is 40 ns, and the clock correction is 30 ns then the remainder timing drift is $t_{mc}(t)$ is 10 ns. Hence, $t_{mc}(t)$ tends to remain a small value, where the drift due to Doppler is compensated by the clock corrections. It is an option therefore to report the compensation values $t_{mc}(t)$ to the location server instead of the Doppler values, or to apply the compensation value to the TOA and report compensated TOA.

For simplicity but without loss of generality, we will sometimes use a simpler form $t_m(t)=at+b$, or $t_{mc}(t)=at+b-t_c(t)$ but that can be easily generalized as shown above.

After changing the problem from a reference node (TDOA) to an unknown time of transmission (TOT), and after compensating all estimated TOA from different measurement groups in order to merge all groups into a unique group with a unique unknown time of transmission, we may now use the formulas for a global or local TOT multilateration.

Figure 3:
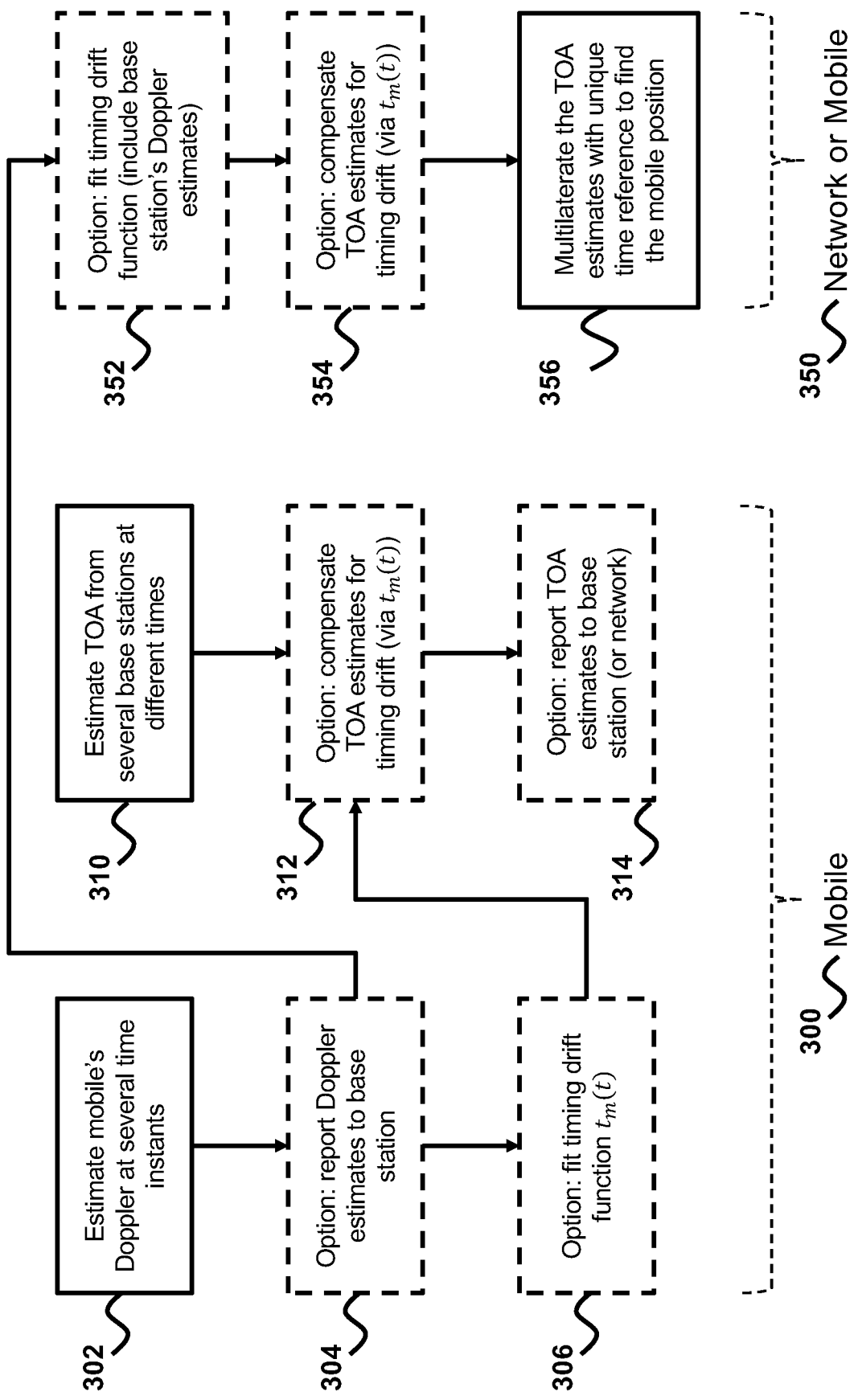
FIG. 3 is a flowchart illustrating processing performed in the mobile followed processing performed by either the network or the mobile according to an embodiment of the invention.

In FIG. 3, processing performed in the mobile 300 followed processing performed by either the network or the mobile 350 are shown. In the mobile 300, we estimate the Doppler at one or more time instants 302, we report the estimated Dopplers to the base station if desired 304, otherwise we perform a fit of the timing drift function $\tau_m(t)$ 306 in the mobile. We also estimate the TOA from several base stations at various times 310, and optionally compensate them 312 in the mobile for the timing drift function $T_m(t)$. The corrected estimates of TOA are optionally reported to the network in step 314.

In 350, network or mobile, we perform the remaining of the processing, namely the multilateration step. If the fitting of the timing drift function $\tau_m(t)$ 352 is not performed in the mobile 300, it is performed at this point. Likewise, for the compensation of the TOA 354 to account for the timing drift function $T_m(t)$. Finally, the multilateration procedure 356 is performed using a unique time reference to estimate the mobile position.

Figure 4:
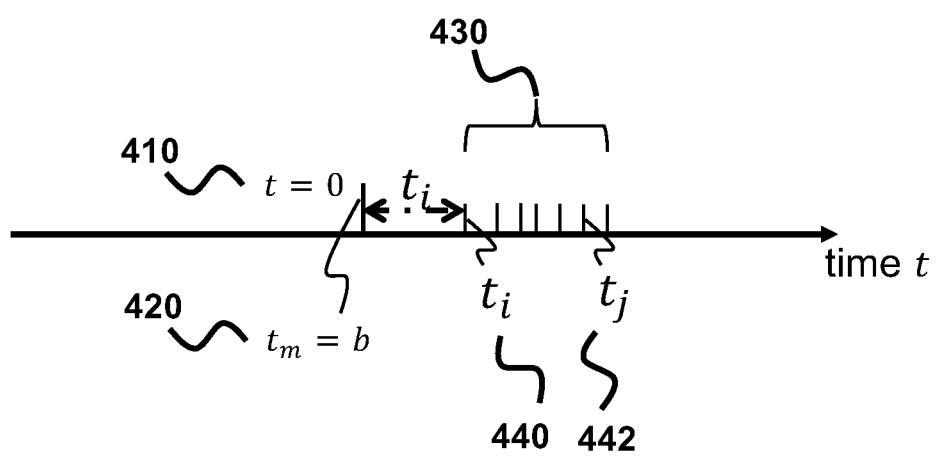
FIG. 4 is a graph illustrating measurements at different times according to an embodiment of the invention.

In FIG. 4 we solve the multilateration problem using a global solution rather than the local Taylor linearization, or we solve a TOT problem rather than a TDOA problem, having x,y,z,b as unknowns where b is reference time; rather than using the range differences or time differences RSTD with only x,y,z as unknowns. 410 is the network reference time that we denote by time t=0. 420 is the mobile reference time (or clock bias) that we denote by time t=b. 430 is one TOA measurement group with network time reference t=0 corresponding to mobile time reference $t_m$=b. 440 and 442 are TOA estimates from various base stations denoted by $t_i, t_j$, etc. and shown on the time axis as vertical bars (i.e. where the time is estimated).

In FIG. 5 we extend the problem to the case where we have more than one TOA measurement group separated by a non-negligible amount of time relative to the clock drift time. For example, a second measurement group is performed 500 ms later than the first measurement group such that a clock drift of 2 ppm translates into a drift time of 1 equivalent to 300 meters in distance. We transform the LTE OTDOA problem of RTSD into a problem of unique time reference, with more equations and higher accuracy, by compensating for the time drift between the measurement groups and merging all measurement groups into a unique one with a unique clock bias b. To do so, we consider several measurement groups at various times 510. We conveniently select t=0 (as reference network time) for the middle group or towards the middle of the measurement campaign. We perform Doppler estimates 520 by mobile or by base station, $$\frac{dt_m(t)}{dt} = a,$$

at various points during the measurement campaign (shortly before and shortly after are options too) and determine an average Doppler value for a (or some Doppler function more generally). For a given TOA 530 such as $t_i$ in a group whose rough time of measurement is denoted by, for example, t', 531, we assume the timing drift function produces a drift of $t_m(t')$=at'+b, 512, to be compensated. We apply the correction at' to the TOA $t_i$ and leave the unknown clock bias b to the multilateration stage (assume b=0 during the compensation stage). For a TOA such as $t_j$, 532, in FIG. 5 lying within the middle of the measurement campaign where we have selected t=0, 533, there is (nearly) no correction to apply since the drift at≈0 is negligible. For a measurement in the last group 534, we may apply the correction at", 535, given the timing drift function value at this point in time, $t_m(t'')$=at"+b. After compensating all measurement groups by the approximately estimated time drift function $t_m(t)$, we merge, 550, all groups into a unique group 560 having corrected time drift from each group. Now the problem is one of one group with a unique time reference and we can apply the multilateration problem using TOT.

The time t and t' denote the measurement times within the UE of two different measurement groups, each of short duration. They also refer to a time of transmission from the base stations of two different sets of reference signals. Only the difference t'−t matters and so we may select t=0 for one of the groups or for some convenient time within the measurement campaign involving several groups over a time period of the order of one or more seconds. The difference t'−t is known and fixed; it is the delta time between transmissions of reference signals from the base stations; however, from the UE's perspective t'−t appears to drift by the (small) amount $t_{mc}(t')−t_{mc}(t)$ that needs to be compensated when referring TOA measurements from different groups to a unique group having a unique time bias (the UE time drifts relative to the base stations time that we assume having some sort of universal time). The TOA estimated for the same base station in two different groups, say $t_i$ and $t'_i$, will be equal after perfect compensation of the timing drift and if we neglect noise (and assuming no UE movement).

The TOA $t_i,t_j$ are relative to group at time t having a short duration or a window within which we can estimate the TOA. Likewise, the TOA, $t'_i,t'_j$ are relative to the group at time t'. In LTE OTDOA, the time window can be one OFDMA symbol within which we measure TOA (with wrap around when the TOA is negative). The OFDMA symbol may be one containing LTE CRS or PRS reference signals.

When timing drift is perfectly compensated, and in the absence of movement and noise, we observe that $t'_i=t_i$ for a given base station. But when there is a drift, we see these quantities drift relative to each other by the amount $t_{mc}(t)$.

Formulae Summary

The main equations that model our system are:

The TOA equation (or measurement or estimation), $$t_i = \frac{d_i}{c} + t_{mc}(t) + n_i$$

The true distance equation, $$d_i = \sqrt{(x-x_i)^2+(y-y_i)^2-(z-z_i)^2}$$

The time drift equation, $$t_m(t)=at+b$$

or higher order and including the accumulated intermittent clock corrections, e.g., $$i\ t_{mc}(t)=a't^2+at+b-t_c(t)$$

The Doppler equation, $$D(t) = \frac{dt_m(t)}{dt} = a$$

or higher order, e.g. D(t)=2a't+a. We exclude $$\frac{dt_c(t)}{dt}$$

from the Doppler formula.

Index i corresponds to an observation (or measurement), and we can have a plurality of observations from each base station, and a plurality of base stations. The unknowns are x, y, z, b, i.e., the position of the UE and the clock bias at the UE. An observation $x_i$, $y_i$, $z_i$, $t_i$ means that we have a base station position as well as the estimated TOA for that base station in the observation with index i. If the base station or satellite were to move, the next measurement from the same base station or satellite will have a known but new set of coordinates $x_j \neq x_i$, $y_j \neq y_i$, $z_1 \neq z_i$.

Finally, the multilateration equation given by, for example, a weighted least squares minimization of the observed noises (including time bias b and the reference cell observations, i≥0) is, $$\min_{x,y,z,b} \sum_{k \geq 0} w_i |n_i|^2$$

or a suboptimum version, typically used in state of the art OTDOA, where various unknowns are eliminated by subtracting the estimation of a pre-selected reference cell (excluding time bias b and the reference cell observations, i>0), $$\min_{x,y,z} \sum_{k>0} w_i |n_i - n_0|^2$$

With $n_i$ obtained from the above equations, $$n_i = t_i - \frac{d_i}{c} - t_{mc}(t),$$

and $w_i$ is a weight value per observation.

In the state-of-the-art TDOA terrestrial methods, e.g. OTDOA, LoRa, WiFi, the time drift equation is eliminated by selecting one of the cells or one of the measurements as reference and subtracting it in order to eliminate $t_{mc}(t)$. However, this is a suboptimal solution in at least two cases: a) the selected reference cell has substantially noisier measurements, and b) when the time drift function can be approximately estimated and subtracted from the measurements over time, which enables keeping the multiple reference cell observations rather than eliminating them. We proceed by estimating $t_{mc}(t)$ and eliminating it, and then by solving the multilateration problem including all observations, i.e. without subtracting the reference cell's observations.

Doppler estimations can occur at various points in time and enable estimating the timing drift function $t_m(t)$. The Doppler estimations do not need to be performed at the same time as TOA estimations are being performed; they may also use different signals (e.g. LTE's PSS, SSS, CRS signals). Doppler estimations may also be performed at the base station side when listening to transmissions from the UE.

The Doppler estimations and accumulated clock corrections can be either reported to the base station who then fits an approximate curve to the time drift function. Or the UE may fit this curve and, in this case, the UE may compensate the TOA estimates by subtracting the estimated time drift $t_{mc}(t)$ (except for the unknown bias b, which is jointly estimated in the multilateration problem).

Finally, the UE reports (optionally compensated) TOA estimations to the location server, or it locally solves the multilateration problem to obtain the UE's position. The multilateration solution we use is not the "range differences" method such as the least squares of $n_i - n_0$ (i>0) and that requires selecting one reference cell; but we solve the improved problem such as the least squares of $n_i$ (i≥0).

An important aspect is that rather than eliminating several measurements, namely the measurements of TOA from the reference cell that are used, in the case of OTDOA, to cancel the timing drift, we have conserved these measurements by using Doppler information and clock corrections, and therefore improved the multilateration solution. Even if measurements occur at different times, i.e. in different measurement groups, the multilateration problem we solve is a unique one with a unique unknown clock bias, as if all measurements occur at the same time since we have compensated for the time drift.

The change necessary to the LTE OTDOA protocol is to include in the report the TOA estimates of the reference cell, and optionally the various estimations of the Doppler at specific times as well as intermittent clock corrections. All of this information can be compiled into a unique report transmitted to the base station at the end of a UE positioning session.

Note that the multilateration problem as we have defined it is occurring at some time t=0 within the UE, with a clock bias of $t_m(0)=b$ relative to the timing of the cells or network. It is therefore the position of the UE at this selected time t=0 that we will determine via multilateration.

In a preferred embodiment, the position at time t=0 is selected toward the middle of the measurement campaign to reduce the impact of drift error on each side of the measurement campaign (start and end sides). In other words, if t=0 is around the middle of the measurement campaign where the UE position will be found, the first measurements are taken at t≤0 and the last measurements are taken at t≥0 in an approximately symmetrical manner.

In some embodiments, the Doppler's impact correction $t_m(t)$ or the accumulated intermittent clock corrections $t_c(t)$ can be neglected. If both types of drifts are ignored then TDOA can be converted into TOT by assuming a non-drifting time of transmission, and without any specific time drift corrections.

Timestamp t is an internal clock of the UE, such as a MAC time and is roughly the time when a given group measurement is performed. For a first measurement group we may denote it by time t, for a second group by t' and for a third by t". The estimated TOA $t_i$ is referenced to timestamp t of a given group.

One solution to upgrade the LTE standard in order to enable the location server to merge multiple groups into a unique group and to benefit from additional estimates of TOA from the reference cell is the following: compensate all TOA measurements for the timing drift, i.e. use $\tilde{t}_i = t_i - t_{mc}(t)$ as compensated TOA. This also applies to the reference cell's TOA estimates, $t_0, t'_0, t''_0, \ldots$ that lead to $\tilde{t}_0 = t_0 - t_{mc}(t)$, $\tilde{t}'_0 = t'_0 - t_{mc}(t')$, $\tilde{t}''_0 = t''_0 - t_{mc}(t'')$). Now all measurement groups can be merged into a unique one with a unique clock bias, as if all measurements occurred roughly around the same time and within the observation window (such as one OFDMA symbol). Then choose one of the reference cell's TOA estimates from one of the groups as the main reference; say for instance, to. Then all measurements from all groups including for the reference cell are converted to RSTD by subtracting to. In particular, for the reference cell, we can have new RSTD estimates (not available in current LTE OTDOA standard), such as $RSTD(0) = \tilde{t}_0 - \tilde{t}'_0$, and $RSTD''(0) = \tilde{t}''_0 - \tilde{t}'_0$, with $RSTD'(0) = 0$ being the reference for all measurements. The location server can reconstruct the TOT problem from the TDOA problem as mentioned previously for a unique measurement group and a unique clock bias. Note that $\tilde{t}_0 - \tilde{t}'_0 \approx \tilde{t}''_0 - \tilde{t}'_0 \approx 0$ (mainly noise residual and UE movement residual).

Other modifications to the LTE OTDOA standard, mathematically equivalent, are feasible. For example, we continue to report RSTD relative to each group but then provide the reference cell's TOA for each group in order to recreate $\tilde{t}_i - \tilde{t}'_0$ from $\tilde{t}_i - \tilde{t}_0$ (by adding $\tilde{t}_0 - \tilde{t}'_0$) and then construct the TOT problem.

Procedure Summary

Figure 9:
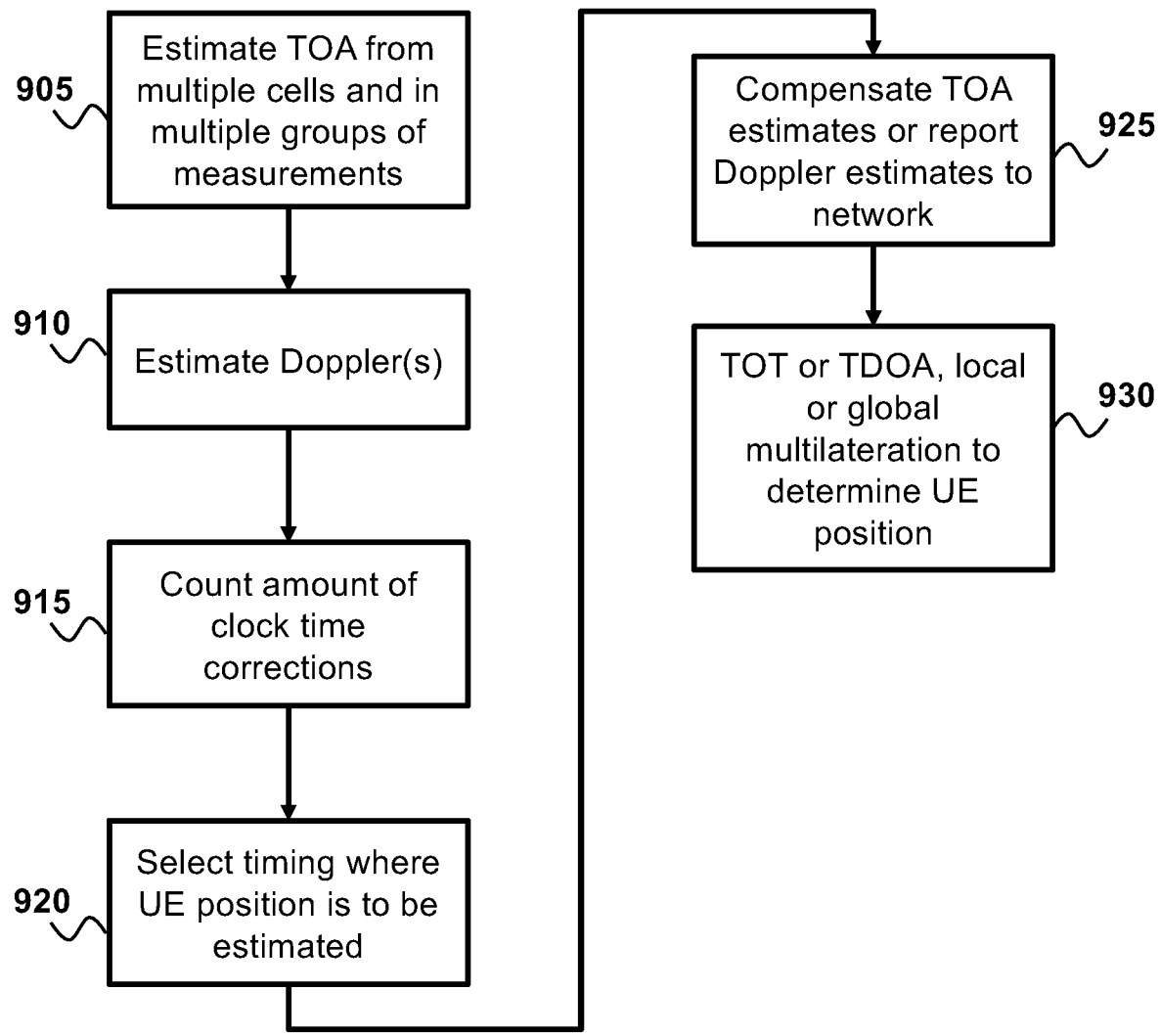
FIG. 9 shows a flowchart summarizing a procedure for position determination according to an embodiment of the invention.

FIG. 9 shows a flowchart summarizing the procedure, which includes the following steps:

Step 905: Estimate the time of arrival from various cells or base stations. It can be performed in one short time window (e.g. 10 ms), or in a measurement campaign consisting of several time windows (or groups of measurements) spread across hundreds of milliseconds. Report all TOA to the location server; alternatively report to the location server LTE OTDOA type RSTD based on some reference cell, and additionally report the TOA of the reference cell if it was estimated more than once. It provides the location server with more observations.

Step 910: Estimate the Doppler at one or more points before, during or after the measurement campaign, preferably as close to the measurement campaign as possible.

Step 915: Count the number of clock time (or sample) corrections performed by the UE during the measurement campaign, if any such corrections are performed.

Step 920: Preferably select the timing $t_m(0)$ where the UE's position is to be calculated toward the middle of the measurement campaign in order to reduce the impact of time drift on each end of the measurement campaign.

Step 925: Compensate the time of arrival estimates by the integrated Doppler and integrated time corrections based on their timing $t_m(t)$ within the measurement campaign, relative to the selected timing $t_m(0)$. Alternatively, report the Doppler and time corrections to the location server who will perform the compensation, possibly with additional UE's Doppler estimates performed by the base station in the uplink direction. In case of reporting the Doppler and time corrections to the location server, include in the report a timestamp of when the measurement was performed (i.e. report time t for each TOA) in order to enable the location server to perform the compensation of $t_{mc}(t)$.

In case of movement, optionally compensate for or report Doppler per cell (cf. section on UE movement).

Step 930: With compensated TOA such that all TOA measurements from all groups can be referenced to a unique unknown TOT parameter or UE clock bias; then obtain a local or global, TOT or TDOA multilateration solution to pinpoint the location of the UE.

UE Movement

If the UE is moving, the estimated clock drift may include the movement's Doppler effect with respect to each cell. In this case, with respect to a reference position at time t=0, for example, we may write $$t_i = \frac{d_i}{c} + t_{mci}(t) + n_i$$

Where $t_{mci}(t)$ is analogous to $t_{mc}(t)$, however obtained separately for each cell of index i. The term $t_{mci}(t)$ models UE clock drift as well as distance drift between the UE and the transmitting antenna i. Although the distance $d_i$ appears constant, nevertheless the true instantaneous distance varies with time and its variable part is included in $t_{mci}(t)$, which is obtained by integrating Doppler, and which models the sum of the drifts due to UE clock drift and distance drift. As such, the distance $d_i$ is the distance at a given time, example at t=0.

The main difference now is that the Doppler estimate depends on each cell i. Therefore, $$t_{mci}(t) = a'_i t^2 + a_i t + b - t_c(t)$$

where the difference with respect to $t_{mc}(t)$ are the Doppler coefficients that are dependent on the cell due to different movement with respect to each cell, $D_i(t) = a'_i t + a_i$. Therefore, the compensated TOA for a given measurement i can be written as compensated $$TOA_i = t_i - a'_i t^2 - a_i t + t_c(t) = \frac{d_i}{c} + b + n_i$$

The main difference with the case without movement is that the Doppler coefficients are cell-dependent ($a'_i$ and $a_i$). As such, the UE may compensate for the various Doppler estimates (for each cell), or may report to the location server the various Doppler estimates, namely, the per cell $a_i$ (and optionally $a'_i$). The location server may then apply the Doppler compensation.

In the linear or quadratic model of the timing drift, the phase noise in the UE's receiver radio may not be sufficiently accurately modeled. In order to reduce the impact of the phase noise, the overall duration of the measurement campaign should be relatively short, e.g. less than 1 or 2 seconds.

In summary, if the UE is moving, the various positions of the UE have been compensated for, via timing drift or Doppler compensation equivalent to movement drift compensation, in order to focus on the position estimation at t=0, as if the UE is not moving. We have transformed the problem of a moving UE to a problem of a fixed UE. Despite UE movement, the various measurements are providing information on the desired fixed position, once we account for the time or movement drift. This transformation is enabled by the knowledge of the Doppler and approximately integrated Doppler (timing drift due to movement). If integrated Doppler is only approximately known, the transformed fixed position problem is an approximate problem, suitable for systems such as LTE OTDOA where most of the noise is generated by an obstructed direct line of sight, by multipath, and by various other imperfections.

The various positions in space that the UE travels through have been virtually repositioned through timing drift compensation at position at t=0. All TOA observations, post compensation, are thus made equivalent to observations taken at time t=0.

In order to estimate relatively accurately the observed Doppler per cell, the UE may use cell-specific signals, e.g. CRS or PRS signals, transmitted every 10 s or 100 s of milliseconds from each cell.

After timing drift compensation of the TOA estimates, the problem is equivalent to a TOT or TDOA problem at position and time t=0 and is solved via usual TOT, TDOA, local or global multilateration.

In a scenario with strong multipath, for a given cell, Doppler estimates may actually be an average obtained over the Dopplers from all multipath, arriving from various directions. In this case, the drift in time of transmission may not be estimated accurately and overall position accuracy may degrade.

In an embodiment, the UE movement is neglected; accuracy may be a little reduced.

REFERENCES

[1] J. Smith and J. Abel, "The Spherical Interpolation Method of Source Localization," *IEEE Journal of Oceanic Engineering*, Vol. OE-12, pp. 246-252, January 1987.

[2] B. Friedlander, "A passive localization algorithm and its accuracy analysis," *IEEE Journal of Oceanic Engineering*, vol. 12, no. 12, pp. 234-245, December 1987.

[3] Y. T. Chan and K. C. Ho, "A simple and efficient estimator for hyperbolic location," *IEEE Trans. Signal Process.*, vol. 42, no. 8, pp. 1905-1915, August 1994.

[4] H. Schau and A. Robinson, "Passive source localization employing intersecting spherical surfaces from time-of-arrival differences," *Acoustics, Speech and Signal Processing, IEEE Transactions on*, vol. 35, no. 8, pp. 1223-1225, August 1987.

[5] K. W. Cheung, H. C. So, W. K. Ma, Y. T. Chan, "A Constrained Least Squares Approach to Mobile Positioning: Algorithms and Optimality," *EURASIP Journal on Advances in Signal Processing* 2006 (1), 1-23.

[6] A. Beck, P. Stoica, and J. Li, "Exact and approximate solutions of source localization problems," *IEEE Transactions on Signal Processing*, vol. 56, no. 5, pp. 1770-1778, 2008.

[7] P. Bestagini, M. Compagnoni, F. Antonacci, A. Sarti, S. Tubaro, "TDOA-based acoustic source localization in the space-range reference frame," *Multidimensional Systems and Signal Processing*, pp. 1-23, March 2013.

[8] S. Bancroft, "An Algebraic Solution of the GPS Equations," IEEE Trans. on Aerospace and Electronic Systems, vol. AES-21, No. 7, January 1985.

The invention claimed is:

1. In a wireless communications system comprising a receiving node and transmitting nodes, wherein the receiving node receives reference signals from the transmitting nodes, a method for location determination comprising:
  estimating time-dependent doppler effect errors in timing of the received reference signals;
  determining a time-dependent receiving node clock drift model from the estimated doppler effect errors;
  correcting TOA measurements of the reference signals using the receiving node clock drift model evaluated at a selected time;
  determining by TOT multilateration a receiving node location at the selected time using the corrected TOA measurements.

2. The method of claim 1 wherein the receiving node estimates the doppler effect errors, determines the receiving node clock drift model, and corrects the TOA measurements.

3. The method of claim 1 wherein one or more of the transmitting nodes estimates the doppler effect errors, determines the receiving node clock drift model, and corrects the TOA measurements.

4. The method of claim 1 further comprising reporting from the receiving node to a location server the TOA measurements of reference signals received from one or more reference cells.

5. The method of claim 4 further comprising reporting from the receiving node to a location server the estimated time-dependent doppler effect errors.

6. The method of claim 4 further comprising reporting from the receiving node to a location server clock corrections from the receiving node clock drift model.

7. The method of claim 1 wherein the TOA measurements of the reference signals are regenerated from RSTD measurements.

8. The method of claim 1 wherein the time-dependent receiving node clock drift model is further determined from accumulated intermittent clock corrections.

* * * * *